(12) United States Patent
Kwon et al.

(10) Patent No.: US 10,219,045 B2
(45) Date of Patent: Feb. 26, 2019

(54) SERVER, IMAGE PROVIDING APPARATUS, AND IMAGE PROVIDING SYSTEM COMPRISING SAME

(71) Applicant: LG ELECTRONICS INC., Seoul (KR)

(72) Inventors: Ilgeun Kwon, Seoul (KR); Sangyong Lim, Seoul (KR); Kidong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 107 days.

(21) Appl. No.: 15/303,214

(22) PCT Filed: Mar. 12, 2015

(86) PCT No.: PCT/KR2015/002410
§ 371 (c)(1),
(2) Date: Oct. 10, 2016

(87) PCT Pub. No.: WO2015/156507
PCT Pub. Date: Oct. 15, 2015

(65) Prior Publication Data
US 2017/0041685 A1 Feb. 9, 2017

Related U.S. Application Data

(60) Provisional application No. 61/977,632, filed on Apr. 10, 2014.

(30) Foreign Application Priority Data

Jun. 13, 2014 (KR) .................. 10-2014-0072283

(51) Int. Cl.
H04N 21/41 (2011.01)
H04N 21/441 (2011.01)
(Continued)

(52) U.S. Cl.
CPC ....... *H04N 21/647* (2013.01); *H04N 21/4126* (2013.01); *H04N 21/4147* (2013.01);
(Continued)

(58) Field of Classification Search
CPC ............ H04N 21/647; H04N 21/4126; H04N 21/4147; H04N 21/441; H04N 21/4751; H04N 21/64322; H04N 21/4668
(Continued)

(56) References Cited

U.S. PATENT DOCUMENTS

2007/0047905 A1* 3/2007 Ahn ..................... G11B 27/32
386/291
2007/0109990 A1* 5/2007 Bennett ............... H04L 12/2898
370/328
(Continued)

FOREIGN PATENT DOCUMENTS

KR 10-0944466 3/2010
KR 10-2013-0056436 5/2013
(Continued)

OTHER PUBLICATIONS

PCT International Application No. PCT/KR2015/002410, Written Opinion of the International Searching Authority dated Jun. 12, 2015, 3 pages.

*Primary Examiner* — Alfonso Castro
(74) *Attorney, Agent, or Firm* — Lee, Hong, Degerman, Kang & Waimey

(57) ABSTRACT

The present invention relates to a server, an image providing apparatus, and an image providing system comprising the same. A server according to an embodiment of the present invention comprises: personal server lists; a memory to store network information of an image providing apparatus corresponding to the personal server lists; an interface unit to, in response to a web address input which is inputted in a (Continued)

terminal, receive a connection request from the terminal; and a processor to control to transmit information for personal server connection to the terminal in response to the connection request, to control to transmit personal server list information corresponding to login information to the terminal when receiving the login information from the terminal, and, if there is an information request from the terminal for a specific personal server list of the personal server lists, to control to transmit network information of the image providing apparatus corresponding to the relevant personal sever to the terminal, wherein the network information includes public IP information and private IP information of the image providing apparatus. Thereby, it is possible to simply connect to the personal server via the terminal.

16 Claims, 26 Drawing Sheets

(51) Int. Cl.
*H04N 21/466* (2011.01)
*H04N 21/475* (2011.01)
*H04N 21/643* (2011.01)
*H04N 21/647* (2011.01)
*H04N 21/4147* (2011.01)

(52) U.S. Cl.
CPC ....... *H04N 21/441* (2013.01); *H04N 21/4751* (2013.01); *H04N 21/64322* (2013.01); *H04N 21/4668* (2013.01)

(58) Field of Classification Search
USPC .......................................................... 725/34
See application file for complete search history.

(56) References Cited

U.S. PATENT DOCUMENTS

| | | | |
|---|---|---|---|
| 2007/0290876 A1* | 12/2007 | Sato ................ | G08C 23/04 340/4.33 |
| 2009/0028167 A1* | 1/2009 | Takeda ............. | H04L 29/12528 370/401 |
| 2009/0235317 A1* | 9/2009 | Igarashi ............ | H04N 7/17309 725/82 |
| 2012/0096508 A1* | 4/2012 | Kim ................. | H04H 20/57 725/118 |
| 2013/0005250 A1* | 1/2013 | Kim ................. | H04N 21/4126 455/41.1 |
| 2013/0057764 A1* | 3/2013 | Choi ................ | H04N 21/42222 348/563 |

FOREIGN PATENT DOCUMENTS

| | | |
|---|---|---|
| KR | 10-2014-0002927 | 1/2014 |
| KR | 10-2014-0016072 | 2/2014 |
| WO | 2012157926 | 11/2012 |

* cited by examiner (a) (b) (c)

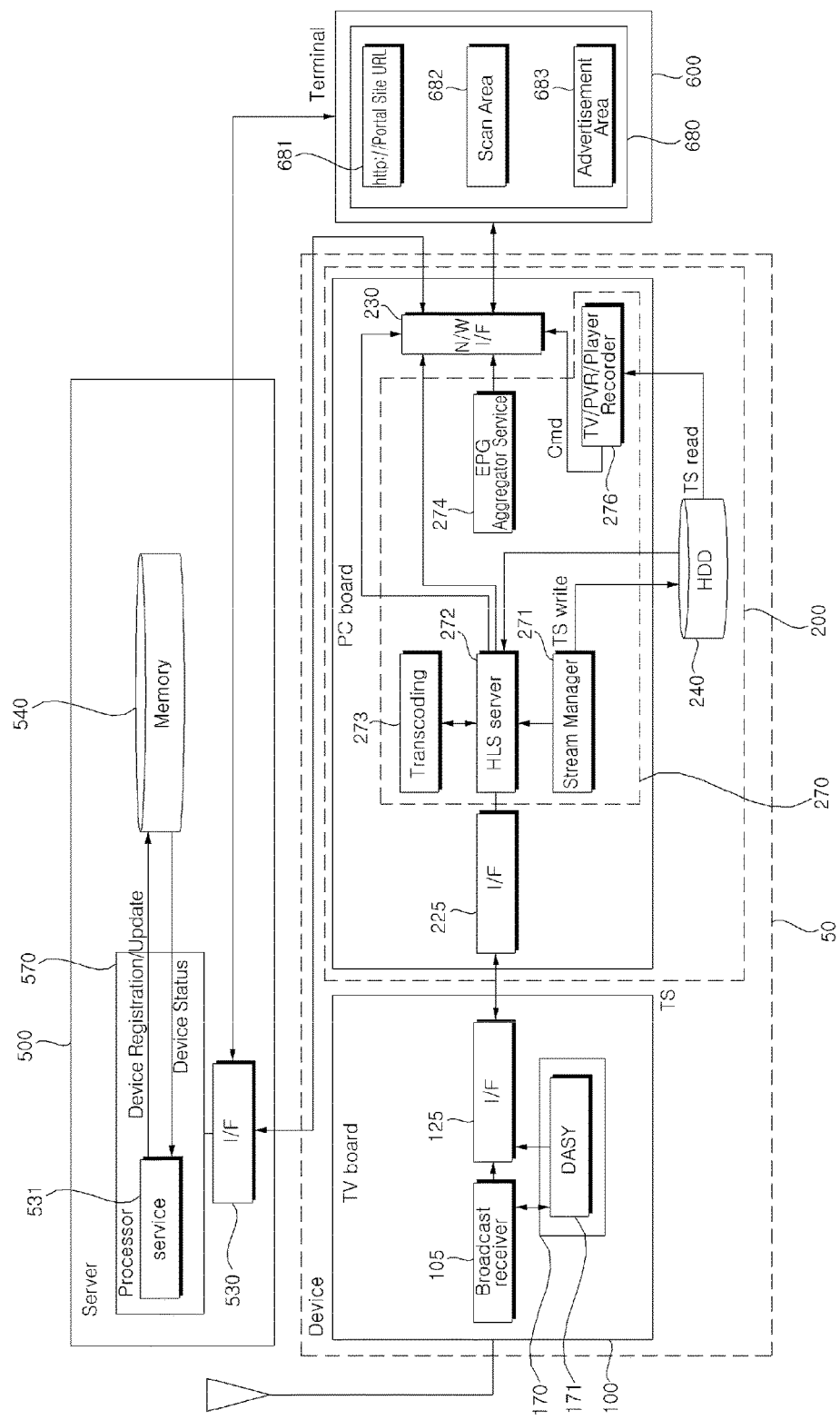

SERVER, IMAGE PROVIDING APPARATUS, AND IMAGE PROVIDING SYSTEM COMPRISING SAME

CROSS-REFERENCE TO RELATED APPLICATIONS

This application is the National Stage filing under 35 U.S.C. 371 of International Application No. PCT/KR2015/002410, filed on Mar. 12, 2015, which claims the benefit of earlier filing date and right of priority to Korean Application No. 10-2014-0072283, filed on Jun. 13, 2014, and claims the benefit of U.S. Provisional Application No. 61/977,632, filed on Apr. 10, 2014, the contents of which are all hereby incorporated by reference herein in their entirety.

TECHNICAL FIELD

The present invention relates to a server, an image providing apparatus, and an image providing system including the same, and more particularly, to a server, an image providing apparatus, and an image providing system including the same which may easily connect to a personal server via a terminal.

BACKGROUND ART

An image providing apparatus is an apparatus having a function to provide images viewable by a user. The user may watch a broadcast program through the image providing apparatus. The image providing apparatus provides a broadcast program selected by the user among broadcast signals transmitted from broadcast stations, and displays broadcast images on the display. Currently, the broadcasting technology is transitioning from analog broadcasting to digital broadcasting around the world.

Digital broadcasting refers to broadcasting for transmitting digital images and voice signals. Compared to analog broadcasting, digital broadcasting is robust to external noises and thus suffers lower data loss. Further digital broadcasting is advantageous in terms of error correction, and provides high definition and clear images. Further, in contrast with analog broadcasting, digital broadcasting enables bidirectional services.

DISCLOSURE

Technical Problem

Therefore, the present invention has been made in view of the above problems, and it is an object of the present invention to an image providing apparatus capable of easily connecting to a personal server via a terminal.

Technical Solution

In accordance with an aspect of the present invention, the above and other objects can be accomplished by the provision of a server including a memory to store a personal server list and network information of an image providing apparatus corresponding to the personal server list, an interface unit to receive a connection request from a terminal in response to a Web address input to the terminal, a processor configured to perform a control operation to transmit information for connection to a personal server to the terminal according to a connection request, to perform a control operation, when login information is received from the terminal, to transmit personal server list information corresponding to the login information to the terminal, and to perform a control operation, when the terminal makes a request for information corresponding to a specific personal server list of the personal server list, to transmit, to the terminal, network information of an image providing apparatus corresponding to a corresponding personal server, wherein the network information includes public IP information and private IP information of the image providing apparatus.

In accordance with another aspect of the present invention, there is provided an image providing apparatus including a broadcast receiver to receive a broadcast signal, an interface unit to exchange data with a server or a terminal, a storage unit to store a content containing the broadcast image, a processor configured to perform a control operation to transmit network information and device information to perform product registration in the server, the network information including public IP information and private IP information, to perform a control operation to transmit a shared content list stored in the storage unit according to a request from the terminal when the terminal remotely connects to the image providing apparatus, and to perform a control operation, when a predetermined broadcast content is selected from the shared content list, to transmit the selected broadcast content to the terminal.

In accordance with another aspect of the present invention, there is provided an image providing system including a terminal, a server configured to transmit, when a Web address for the server is input to the terminal, information for connection to a personal server to the terminal according to a connection request from the terminal, to transmit, when login information is received from the terminal, personal server list information corresponding to the login information to the terminal, and to transmit, when the terminal makes a request for information corresponding to a specific personal server list of the personal server list, network information of an image providing apparatus corresponding to a corresponding personal server, and an image providing apparatus configured to transmit a shared content list stored in the storage unit according to a request from the terminal when the terminal remotely connects to the image providing apparatus, and to transmit, when a predetermined broadcast content is selected from the shared content list, the selected broadcast content to the terminal.

Advantageous Effects

According to an embodiment of the present invention, a server includes a memory to store a personal server list and that network information of an image providing apparatus corresponding to the personal server list, an interface unit to receive a connection request from a terminal in response to a Web address input to the terminal, and a controller configured to perform a control operation to transmit, to the terminal, information for connection to a personal server according to the connection request to perform a control operation to transmit, when login information is received from the terminal, personal server list information corresponding to the login information to the terminal, and to perform a control operation to transmit, when the terminal makes a request for information corresponding to a specific personal server list in the personal server list, network information of an image providing apparatus corresponding to the personal server to the terminal. Thereby, connection to a personal server may be easily performed via the terminal.

Meanwhile, the login information includes public IP information and private IP information corresponding to an image providing apparatus, and a server updates and stores the variable private IP information. Accordingly, the image providing apparatus may easily connect to a personal server via a terminal.

The server may vary provided advertisement information depending on whether or not logging has been performed. Thereby, an appropriate customized advertisement may be provided for the user.

As the image providing apparatus, which is a personal server, is connected via a terminal, contents in the image providing apparatus may be shared.

In addition, as the image providing apparatus transmits, to a terminal, a broadcast image stream corresponding to a received broadcast signal, live broadcast images may be easily watched.

Meanwhile, the image providing apparatus may include a first circuit board including a broadcast receiver and a second circuit board including a storage unit. Thereby, a received broadcast content may be stably stored in the storage unit of the second circuit board to which has a large storage space, according to an input for storing broadcast.

BEST MODE

Reference will now be made in detail to the preferred embodiments of the present invention, examples of which are illustrated in the accompanying drawings.

As used herein, the suffixes "module" and "unit" are added to simply facilitate preparation of this specification and are not intended to suggest special meanings or functions. Therefore, the suffixes "module" and "unit" may be used interchangeably.

Figure 1:
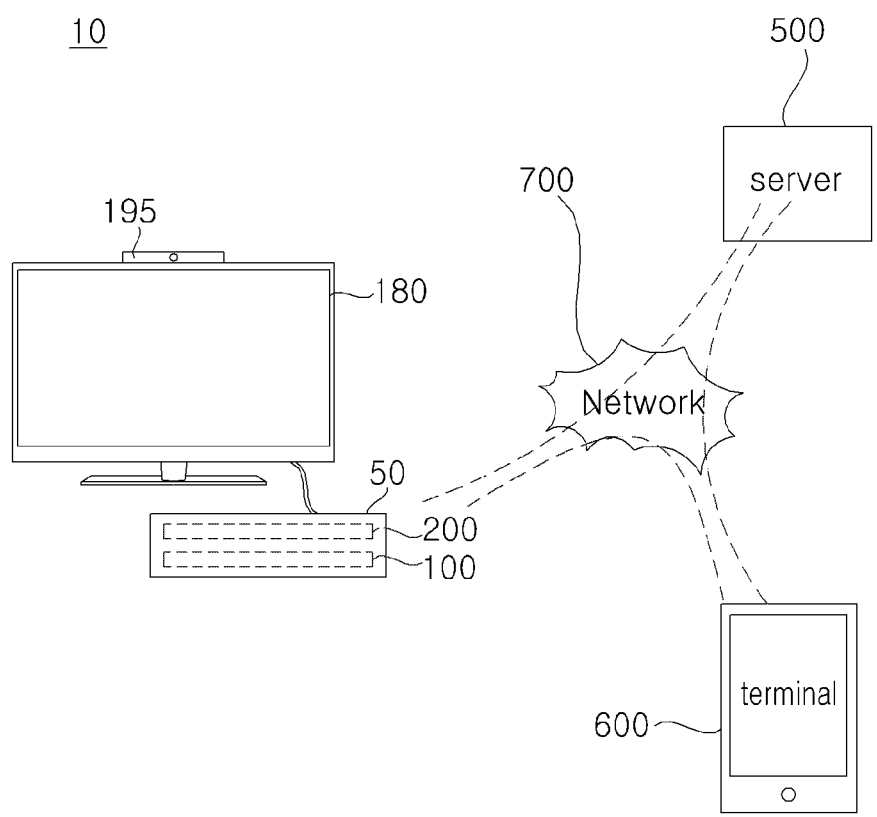
FIG. 1 illustrates an image providing system according to an embodiment of the present invention.

FIG. 1 illustrates an image providing system according to an embodiment of the present invention.

Referring to FIG. 1, according to an embodiment of the present invention, an image providing system 10 may include a terminal 600, a server 500, and an image providing apparatus 50.

The terminal 600 may connect to the server 500 according to an input web address, receive information for connection to a personal server from the server 500, and display a screen for connection to the personal server.

When login information is input on the personal server connection screen, the terminal 600 may transmit login information to the server 500, receive personal server list information corresponding to the login information from the server 500, and display a personal server list screen.

When one of personal servers is selected on the displayed personal server list screen, the terminal 600 makes a request to the server 500 for network information corresponding to the selected personal server.

The server 500 transmits the network information corresponding to the requested personal server to the terminal 600, and the terminal 600 receives the network information corresponding to the personal server from the server 500. Then, the terminal 600 may connect to the selected personal server using the received network information.

Herein, the personal server may correspond to the image providing apparatus 50 shown in FIG. 1. That is, when one personal server is selected, the terminal 600 may connect to the corresponding image providing apparatus 50.

The image providing apparatus 50, which is an apparatus for providing images, may provide a predetermined image to an external device.

In particular, the image providing apparatus 50 may receive a broadcast signal, and perform signal processing thereon. Thereby, the image providing apparatus 50 may provide streaming of a broadcast content, or transmit a content stored in the memory. That is, the image providing apparatus 50 may operate as a personal server.

To implement transmission of a content to the outside, the image providing apparatus 50 may have network information. Herein, the network information may include public IP information and private IP information.

To connect to an external server 500 or the terminal 600, the image providing apparatus 50 may connect to a network 700 via an AP device (not shown).

Herein, network information corresponding to the AP device (not shown) may include public IP information.

A device, particularly, the image providing apparatus 50 that is connected to the AP device (not shown) in a wired or wireless manner constitutes an internal network in the AP device (not shown), and thus may be assigned a private IP by the AP device (not shown). Accordingly, the network information corresponding to the image providing apparatus 50 in the AP device (not shown) may include private IP information.

That is, in order to connect to the external server 500 or the terminal 600, the image providing apparatus 50 may have public IP information corresponding to the AP device (not shown) and private IP information corresponding to the image providing apparatus 50.

Thereby, when one personal server is selected, the terminal 600 receives, from the server 500, the network information of the image providing apparatus 50 corresponding to the personal server, namely the public IP information and the private IP information, and connects to the image providing apparatus 50 using the network information.

In addition, the terminal 600 may receive the shared content list information from the connected image providing apparatus 50, and display a shared content list screen. If the user selects any one content from the list, the terminal 600 may make a request for transmission of the content to the connected image providing apparatus 50, and receive the content Thereby, the user of the terminal 600 may remotely connect to the image providing apparatus 50, which is a personal server, receive desired content and easily watch the same. Accordingly, user convenience may be enhanced.

In particular, only if a web address is input on the web browser without a separate application installed on the terminal 600, the terminal 600 may be provided with a screen for connection to a personal server from the image providing apparatus 50. After logging operation is performed, the terminal 600 may be provided with a personal server list screen, and easily connect to the selected personal server, namely the image providing apparatus 50.

In particular, since the terminal 600 may receive private IP information of the image providing apparatus 50 from the server 500, connection to the image providing apparatus 50 is facilitated.

Meanwhile, the terminal 600 may conceptually include a fixed terminal or a mobile terminal.

When the terminal 600 is connected according to the web address input, the server 500 may provide a screen for connection to the personal server.

The server 500 may have a plurality of web addresses, and provide server connection screens for different user interfaces according to the respective web addresses.

For example, when a web address for a PC is input, the server 500 provides the server 500 with a server connection screen corresponding to a first resolution. When a web address for a mobile device is input, the server 500 may provide the server 500 with a server connection screen corresponding to a second resolution which is lower than the first resolution.

As another example, when a first web addresses are input, a server connection screen corresponding to the first web address may be provided to the server 500. When a second web address is input, a second server connection screen corresponding to the second web address may be provided to the server 500.

When login information is received from the terminal 600, the server 500 may provide corresponding personal server list information to the terminal 600 based on the login information.

If a personal server list corresponding to the login information is pre-stored, the server 500 may provide corresponding personal server list information to the terminal 600 based on the login information.

The memory 540 (see FIG. 6A) in the server 500 may store login information corresponding to a person, device information of the image providing apparatus, server list information corresponding to the login information, and network information corresponding to the respective personal servers. Herein, the network information may include the aforementioned public IP information and private IP information.

When a request for network information corresponding to a specific personal server in the personal server list is received from the terminal 600, the server 500 may perform a control operation to transmit, to the terminal 600, network information corresponding to the specific personal server, namely public IP information and private IP information. The server 500 may further transmit device information and account information (account ID).

Meanwhile, the server 500 may frequently connect to the image providing apparatus 50 to receive network information corresponding to the personal server, namely the image providing apparatus 50 and perform a control operation to update the network information.

In contrast with the AP device (not shown), which is kept turned on, the image providing apparatus 50 is turned on only when it is used. Accordingly, the private IP information may frequently change. To update such private IP information, the server 500 may connect to the image providing apparatus 50 to receive new network information, in particular, private IP information whenever it is allowed, in particular, whenever it is turned on.

The server 500 may store the new network information as updated network information for the image providing apparatus 50.

The server 500 may transmit the updated network information to the terminal 600 when the terminal 600 requests the same. The terminal 600 may receive the updated network information from the server 500 without a separate procedure, and easily connect to the image providing apparatus 50, which is a personal server.

The server 500 may provide advertisement information when it provides information for connection to a personal server. In addition, after being logged in, the server 500 may provide the advertisement information along with the personal server information.

The server 500 may vary the type and attributes of the provided advertisement information depending on whether logging has been performed or not. That is, after logging is performed, the server 500 may provide customized advertisement information to the user.

The server 500 described in this specification may be a server enabling remote control of the image providing apparatus. That is, the server 500 may be a remote access control (RAC) server.

The image providing apparatus 50 may include a first circuit board 100, which includes a broadcast receiver 105 (see FIG. 2), and a second circuit board 200, which includes a storage unit 240 (see FIG. 2) having a large storage capacity.

The first circuit board 100 and the second circuit board 200 may be detachably provided in the image providing apparatus 50.

The first circuit board 100 and the second circuit board 200 may exchange data with each other via a first interface unit 125 and a second interface unit 225.

The second circuit board 200 may transmit, to the first circuit board 100, a signal for a background image or an image or content reproduced by the second circuit board 200, and the first circuit board 100 may transmit, to the second circuit board 200, a control signal or a broadcast signal or image to be stored.

In particular, when an input for saving broadcast is provided, the first circuit board 100 may transmit a signal-processed broadcast signal or broadcast image to the second circuit board 200.

The first circuit board 100 may be referred to as a TV board, and the second circuit board 200 may be referred to as a PC board.

In particular, components of the second circuit board 200 may be upgraded through a detachable structure.

According to an embodiment of the present invention, the image providing apparatus 50 may provide a home screen including a TV screen and a PC screen as a user interface which may be conveniently used by the user.

The first circuit board 100 may be separated from the second circuit board 200. Thereby, when one of the two circuit boards, in particular, the second circuit board 200 malfunctions, broadcast images may be stably provided through the first circuit board 100.

The processor of the second circuit board 200 is better than the processor of the first circuit board 100 in terms of processing speed, processing capacity, and the like. Thereby, the second circuit board 200 may be responsible for high-performance functions, for example, image capturing through a camera, gesture recognition, Web connection, and executing games. In addition, the second circuit board 200 may provide the first circuit board 100 with screens according to the respective functions.

In FIG. 1, the image providing apparatus 50 is illustrated as not including either a display 180 or a camera 195. However, the image providing apparatus 50 according to an embodiment of the present invention may conceptually include the display 180. If the display 180 is included in the image providing apparatus 50, the image providing apparatus 50 may be referred to as an image display apparatus.

The display 180 may be a PDP, an LCD display, OLED display, a flexible display, or a 3D display.

The display 180 may be configured by a touchscreen to be used not only as an output device but also as an input device.

The camera 195 captures an image of the user. The camera 195 may be implemented by one camera. However, embodiments of the present invention are not limited thereto. The camera 195 may be implemented by a plurality of the cameras. The camera 195 may be buried in an upper portion of the display 180 or may be separately disposed. Image information captured by the camera 195 may be input to the image providing apparatus 50.

Figure 2:
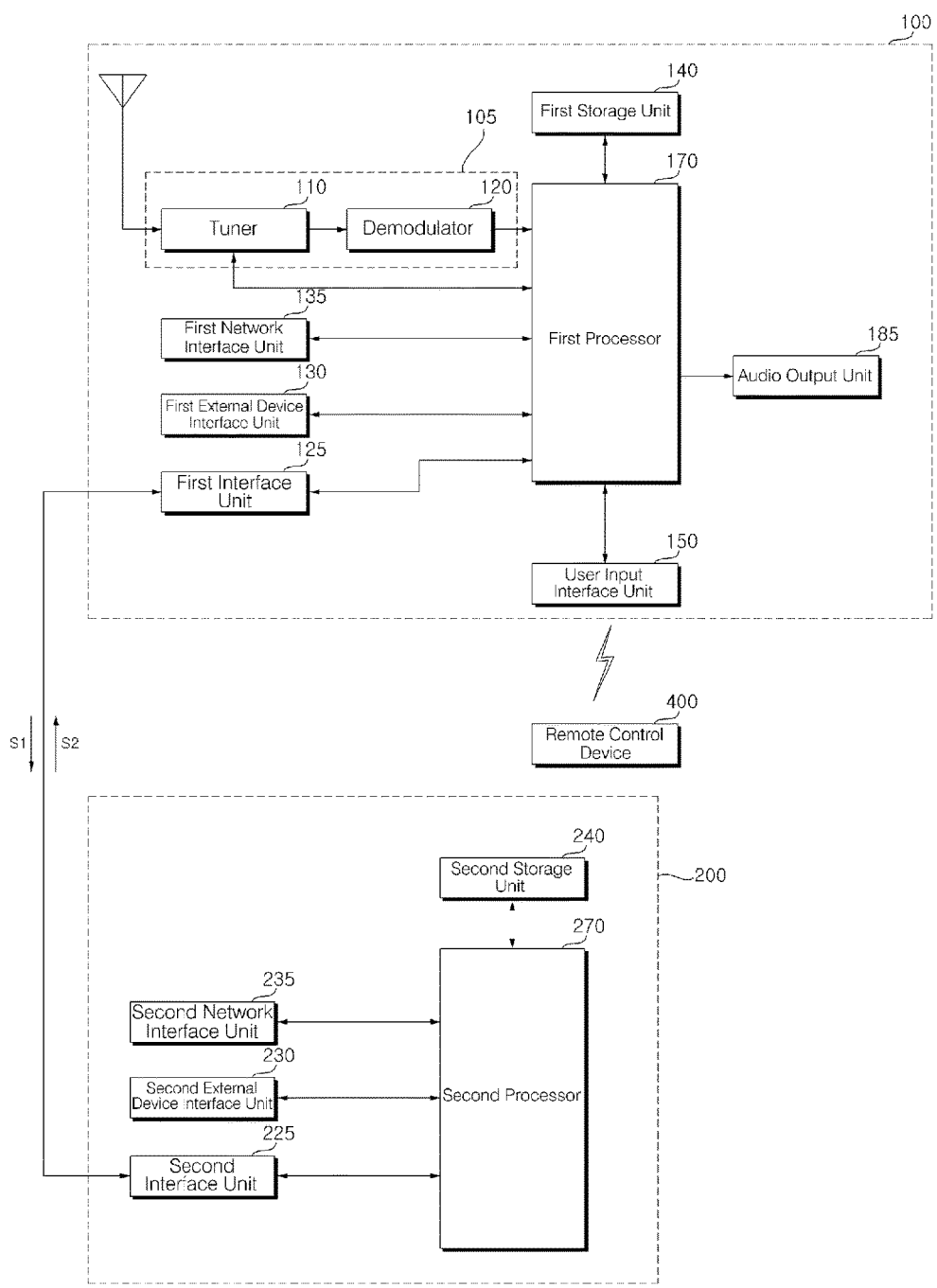
FIG. 2 is an internal block diagram illustrating an image providing apparatus in the image providing system of FIG. 1.

FIG. 2 is an internal block diagram illustrating an image providing apparatus in the image providing system of FIG. 1.

Referring to FIG. 2, the image providing apparatus 50 according to an embodiment may include a first circuit board 100 and a second circuit board 200.

The first circuit board 100 may include a broadcast receiver 105, a first interface unit 125, a first external device interface unit 130, a first network interface unit 135, a first storage unit 140, a user input interface unit 150, a first processor 170, and an audio output unit 185.

The second circuit board 100 may include a second interface unit 225, a second external device interface unit 230, a second network interface unit 235, a second storage unit 240, and a second processor 270.

The broadcast receiver 105 may include a tuner 110 and a demodulator 120. While the broadcast receiver 105 is illustrated as not having the first network interface unit 135, it is possible for the broadcast receiver 105 to further include the first network interface unit 135. Alternatively, the broadcast receiver 105 may include only the first network interface unit 135 without including the tuner 110 and the demodulator 120.

In contrast with the example of the figure, the broadcast receiver 105 may further include the first external device interface unit 135. For example, a broadcast signal from an external set-top box may be received through the first external device interface unit 135.

The tuner 110 selects a channel selected by a user from among radio frequency (RF) broadcast signals received through an antenna 50 or an RF broadcast signal corresponding to all pre-stored channels. In addition, the tuner 110 converts the selected RF broadcast signal into a middle-frequency signal, a base band image, or a voice signal.

Meanwhile, the tuner 110 may sequentially select an RF broadcast signal for all broadcast channels stored through the channel memorization function, from among RF broadcast signals received through the antenna, and convert the same into a middle-frequency signal, baseband image, or voice signal.

To receive broadcast signals of a plurality of channels, a plurality of tuners 110 may be provided. Alternatively, a single tuner to receive a plurality of channels simultaneously may be provided.

The demodulator 120 receives and demodulates the DIF signal converted by the tuner.

After performing demodulation and channel decoding, the demodulator 120 may output a stream signal (TS). Herein, the stream signal may be a signal obtained by multiplexing an image signal, voice signal or data signal.

The stream signal output from the demodulator 120 may be input to the first processor 170. After performing demultiplexing and image/voice signal processing, the first processor 170 outputs an image to the display 180 and voice to the audio output unit 185.

The first interface unit 125 exchanges data with the second interface unit 225 of the second circuit board 200.

In particular, when an input for saving broadcast is provided, the first processor 170 may transmit a signal-processed broadcast signal or broadcast image to the second interface unit 225 via the first interface unit 125.

The first interface unit 125 may receive a played broadcast signal or broadcast image from the second interface unit 225. Alternatively, the first interface unit 125 may receive a background image.

The first interface unit 125 may transmit a control signal for controlling the second circuit board 200.

The first interface unit 125 and the second interface unit 225 may perform high-definition multimedia Interface (HDMI) communication.

The first external device interface unit 130 may transmit or receive data to or from a connected external device (not shown). To this end, the first external device interface unit 130 may include an A/V input/output unit (not shown) or a wireless communication unit (not shown).

The first external device interface unit 130 may be connected to external devices such as a DVD (digital versatile disk), a Blu-ray, a gaming device, a camera, a camcorder, a computer (laptop), and a set-top box in a wired/wireless manner, and perform input/output operations with external devices.

The A/V input/output unit may receive image and voice signals input from an external device. The wireless communication unit may perform short-range wireless communication with other electronic devices.

The first external device interface unit 130 may include a USB terminal, a CVBS terminal, a component terminal, an S-video terminal, a DVI terminal, a high-definition multimedia interface (HDMI) terminal, an RGB terminal, and a D-SUB terminal.

The first network interface unit 135 provides an interface for connecting the image providing apparatus 50 with a wired/wireless network including the Internet. For example, the first network interface unit 135 may receive content or data provided by a content provider or a network operator over a network.

The first storage unit 140 may store programs for processing and control of signals in the first processor 170, and also store a signal-processed image, voice signal or data signal.

The first storage unit 140 may function to temporarily store an image signal, a voice signal or a data signal input through the first external device interface unit 130. In addition, the first storage unit 140 may store information corresponding to a predetermined broadcast channel through the channel memorization function such as a channel map.

While it is illustrated in FIG. 2 that the first storage unit 140 is provided separately from the first processor 170, embodiments of the present invention are not limited thereto. The first storage unit 140 may be provided in the first processor 170.

The user input interface unit 150 may transmit a signal input by the user to the first processor 170 or transmit a signal from the first processor 170 to the user.

For example, the user input interface unit 150 may transmit/receive user input signals such as power on/off, channel selection, and screen window setting to/from the remote control device 400, deliver, to the first processor 170, user input signals input through local keys (not shown) such as a power key, a channel key, a volume key, or a setting key, deliver, to the first processor 170, user input signals input through a sensor unit (not shown) configured to sense gesture of the user, or transmit a signal from the first processor 170 to the sensor unit (not shown).

The first processor 170 may demultiplex streams input through the tuner 110, demodulator 120, network interface unit 135 or first external device interface unit 130, or process demultiplexed signals. Thereby, the first processor 170 may generate an output signal for outputting an image or voice.

An image signal image-processed by the first processor 170 may be input to the display 180 and an image corresponding to the image signal may be displayed. In addition, the image signal which is image-processed by the first processor 170 may be input to an external output device through the first external device interface unit 130.

A voice signal processed by the first processor 170 may be output to the audio output unit 185 in the form of sound. In addition, the voice signal processed by the first processor 170 may be input to an external output device through the first external device interface unit 130.

The first processor 170 may run a first OS, using the first OS-related data stored in the first storage unit 140. In addition, the first processor 170 may execute various applications which are based on the first OS.

For example, the first OS-based applications may include at least one of an application related to external input, a broadcast guide application, an application related to stored broadcast contents, a Bluetooth application, a reservation application, a digital video recorder (DVR) application, a hotkey application, an application of Internet phone call service according to connection to a network, a VOD service application, a web album service application, a social networking service (SNS) application, a location-based service (LBS) application, a map application, a web search application, a game application, a schedule management application, and the like.

The first OS may be a UNIX (LINUX)-based OS, a Web-based OS, or the like.

Although not shown in FIG. 2, the first processor 170 may include a demultiplexer and an image processor. Details will be described with reference to FIG. 3 later.

The first processor 170 may control overall operations in the image providing apparatus 50. The first processor 170 may control overall operations of the respective units on the first circuit board 100 in the image providing apparatus 50.

For example, the first processor 170 may control the tuner 110 to tune in RF broadcasting corresponding to a channel selected by the user or a pre-stored channel.

The first processor 170 may control the image providing apparatus 50 according to a user command input through the user input interface unit 150 or an internal program.

The first processor 170 may control the display 180 to display an image. Herein, the image displayed on the display 180 may be a still image, a moving image, a 2D image, or a 3D image.

The first processor 170 may recognize the location of the user based on an image captured by the camera 195. For example, the first processor 170 may recognize the distance between the user and the image providing apparatus 50 (i.e., a z-axis coordinate). Additionally, the first processor 170 may recognize an x-axis coordinate and y-axis coordinate on the display 180 corresponding to the location of the user.

Although not shown in the figure, a channel browsing processor for generating a thumbnail image corresponding to a channel signal or an external input signal may be further provided. The channel browsing processor may receive input of a stream signal (TS) output from the demodulator 120 or a stream signal output from the first external device interface unit 130, and extract an image from the input stream signal to generate a thumbnail image. The generated thumbnail image may be subjected to stream decoding together with a decoded image and then input to the first processor 170. Using the input thumbnail image, the first processor 170 may display a thumbnail list including a plurality of thumbnail images on the display 180.

The audio output unit 185 receives a voice signal processed by the first processor 170 and outputs voice.

A power supply (not shown) supplies power to overall parts of the image providing apparatus 50. In particular, the power supply 190 may supply power to the first processor 170, which may be implemented in the form of system on chip (SOC), the display 180 for display of images, and the audio output unit 185 for providing audio output.

Specifically, the power supply (not shown) may include a converter to convert alternating current (AC) power into direct current (DC) power and a DC-DC converter to change the level of the DC power.

The remote control device 400 transmits a user input to the user input interface unit 150. To this end, the remote control device 400 may employ Bluetooth, radio frequency (RF) communication, infrared (IR) communication, ultra-wideband (UWB), or ZigBee. In addition, the remote control device 400 may receive an image signal, a voice signal or a data signal from the user input interface unit 150, and display or output the same.

The image providing apparatus 50 may be a fixed or mobile digital broadcast receiver capable of receiving digital broadcast services.

The second interface unit 225 in the second circuit board 200 exchanges data with the first interface unit 125 of the first circuit board 100.

In particular, when an input for saving broadcast is provided, the second interface unit 225 may receive a signal-processed broadcast signal or broadcast image from the first interface unit 125 of the first circuit board 100.

When an input for playing broadcast is provided, the second interface unit 225 may transmit a signal-processed broadcast signal or broadcast image to the first interface unit 125 of the first circuit board 100.

To provide the Home screen, the second interface unit 225 may transmit a background image to the first interface unit 125 of the first circuit board 100.

The second interface unit 225 may receive a control signal for controlling the second circuit board 200 from the first interface unit 125 of the first circuit board 100.

The second external device interface unit 230 may transmit or receive data to or from the connected external device 290. To this end, the second external device interface unit 230 may include an A/V input/output unit (not shown) or a wireless communication unit (not shown).

The second external device interface unit 230 may be connected to an external device such as a digital versatile disk (DVD), Blu-ray, a gaming console, a camera, a camcorder, a computer (laptop), or a set-top box in a wired/wireless manner, and perform an input/output operation with the external device.

The second external device interface unit 230 may include a USB terminal, a CVBS terminal, a component terminal, an S-video terminal, a DVI terminal, a high-definition multimedia interface (HDMI) terminal, an RGB terminal, and a D-SUB terminal.

The second network interface unit 235 provides an interface for connecting the image providing apparatus 50 to a wired/wireless network including the Internet network. For example, the second network interface unit 235 may receive contents or data provided by an Internet or content provider or a network operator over a network.

The second storage unit 240 may store programs for signal processing and control in the second processor 270, or store signal-processed image, voice or data signals.

The second storage unit 240 may also function to temporarily store image, voice or data signals input from the second external device interface unit 230.

The second processor 270 may perform signal processing on external input signals through the second external device interface unit 230, and generate and output a signal for image output or voice output.

The second processor 270 may be responsible for high-performance functions, for example, image capturing through a camera, gesture recognition, Web connection, and executing games. In addition, the second processor 270 may provide the first circuit board 100 with screens according to the respective functions.

A voice signal processed by the second processor 270 may be transmitted to the first circuit board 100 via the second interface unit 225, and output from the (285) in the first circuit board 100 in the form of sound.

Besides, the second processor 270 may control overall operations in the image providing apparatus 50. In particular, the second processor 270 may control overall operations of the respective units in the second circuit board 200.

The second processor 270 may recognize the position of the user based on an image captured through the camera 195. For example, the second processor 270 may recognize a distance (a z-axis coordinate) between the user and the image providing apparatus 50. Additionally, the second processor 270 may recognize an x-axis coordinate and y-axis coordinate in the display 180 corresponding to the position of the user.

The second processor 270 may run a second OS using data related to the second OS stored in the second storage unit 240. In addition, the second processor 270 may execute various applications which are based on the second OS.

Herein, the second OS may be different from the first OS and may be an OS which is based on Windows, MAC, UNIX, or the like.

For example, the second OS-based applications may include at least one of a news-related application, an SNS-related application, a mail-related application, a document preparation-related application, an image playback-related application, audio playback-related application, a web browser application, a gaming application, a map application, a schedule management application, and the like.

The block diagram of the image providing apparatus 50 shown in FIG. 2 is simply illustrative. Constituents of the block diagram may be integrated, added or omitted according to the specification of the image providing apparatus 50 which is implemented in reality. That is, two or more constituents may be combined into one constituent, or one constituent may be subdivided into two or more constituents, when necessary. In addition, the function performed in each block is simply illustrative, and it should be noted that specific operations or devices of the blocks do not limit the scope of the present invention.

Figure 3:
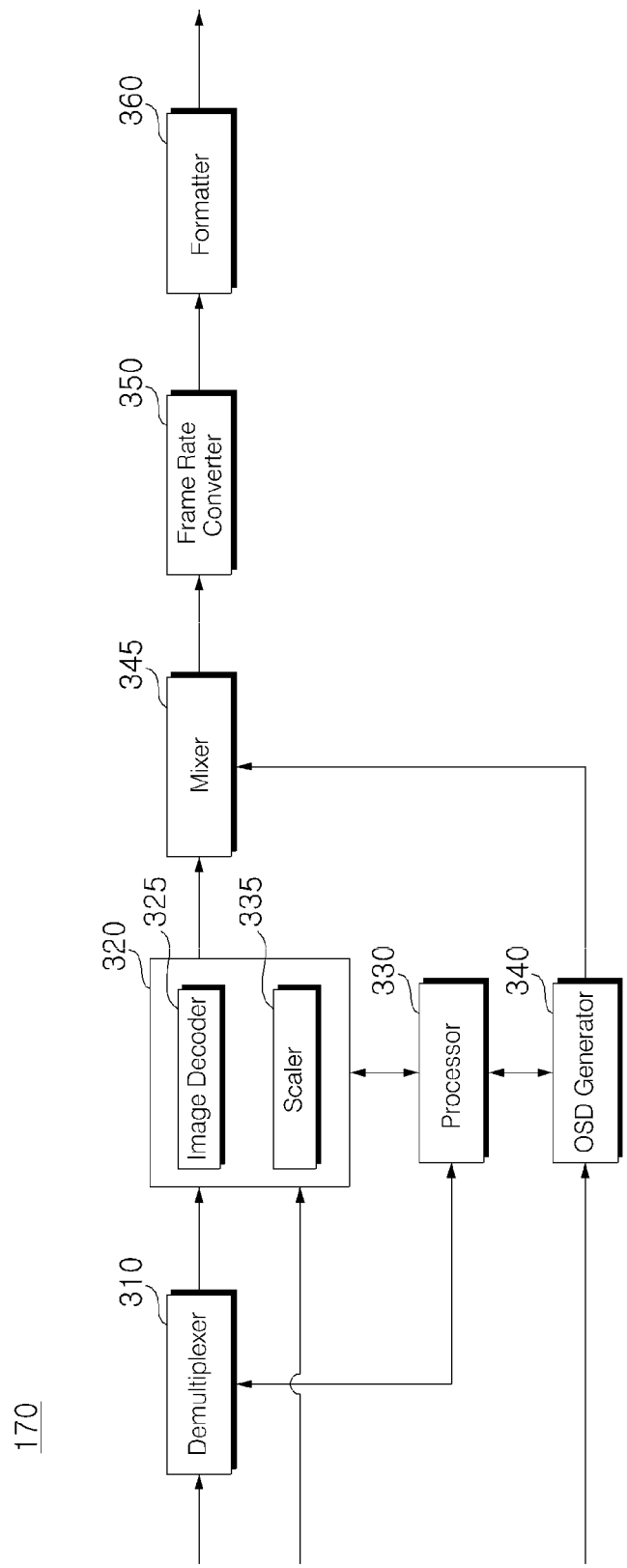
FIG. 3 is an internal block diagram illustrating a first processor of FIG. 2.

FIG. 3 is an internal block diagram illustrating the first processor of FIG. 2.

Referring to FIG. 3, the first processor 170 according to an embodiment of the present invention may include a demultiplexer 310, an image processor 320, a processor 330, an OSD generator 340, a mixer 345, a frame rate converter 350, and a formatter 360.

The demultiplexer 310 demultiplexes an input stream. For example, when MPEG-2 TS is input, the demultiplexer 310 may demultiplex the same to separate the stream into an image signal, a voice signal and a data signal. Herein, the stream signal input to the demultiplexer 310 may be a stream signal output from the tuner 110, the demodulator 120 or the first external device interface unit 130.

The image processor 320 may perform image processing on a demultiplexed image signal. To this end, the image processor 320 may include an image decoder 325 and a scaler 335.

The image decoder 325 decodes the demultiplexed image signal, and the scaler 335 scales the resolution of the decoded image signal such that the image signal can be output through the display 180.

The image decoder 325 may include decoders of various standards.

The processor 330 may control overall operation of the image providing apparatus 50 or the first processor 170. For example, the processor 330 may control the tuner 110 to tune in RF broadcasting corresponding to a channel selected by the user or a pre-stored channel.

In addition, the processor 330 may control the image providing apparatus 50 according to a user command input through the user input interface unit 150 or an internal program.

The processor 330 may control data transmission with the first network interface unit 135 or the first external device interface unit 130.

The processor 330 may control operations of the demultiplexer 310, image processor 320 and OSD generator 340 in the first processor 170.

The OSD generator 340 generates an OSD signal automatically or according to user input. For example, the OSD generator 340 may generate a signal for display of various kinds of information in the form of graphic images or texts on the screen of the display 180 based on a user input signal. The generated OSD signal may include various data including the user interface screen window of the image providing apparatus 50, various menu screen windows, widget, and icons.

The OSD generator 340 may generate a pointer which can be displayed on the display, based on a pointing signal input from the remote control device 400. In particular, the pointer may be generated by a pointing signal processor (not shown), and the OSD generator 340 may include the pointing signal generator. Of course, it is possible to provide the pointing signal processor (not shown) separately from the OSD generator 340.

The mixer 345 may mix the OSD signal generated by the OSD generator 340 with an image signal processed and decoded by the image processor 320. Herein, each of the OSD signal and the decoded image signal may include at least one of a 2D signal and a 3D signal. The mixed image signal is provided to the frame rate converter 350.

The frame rate converter (FRC) 350 may convert the frame rate of an input image. The FRC 350 may output the frame rate without performing separate frame rate conversion.

The formatter 360 may change the format of an input image signal to a predetermined format.

For example, the formatter 360 may arrange a left image frame and right image frame of a 3D image produced through frame rate conversion. The formatter 360 may output a synchronization signal Vsync to open the left eye glass or right eye glass of a 3D view apparatus (not shown).

The formatter 360 may change the format of a 3D image signal. For example, the formatter 360 may change the format of the 3D image signal to one of various 3D formats.

The formatter 360 may convert a 2D image signal into a 3D image signal. For example, the formatter 360 may detect an edge or a selectable object in a 2D image signal, and separate and generate the object according to the detected edge of the selectable object as a 3D image signal. In this case, the generated 3D image signal may be separated into a left image signal L and a right image signal R to be aligned.

An audio processor (not shown) in the first processor 170 may process a demultiplexed voice signal. To this end, the audio processor (not shown) may include various decoders.

The audio processor (not shown) in the first processor 170 may perform processing such as adjustment of bass, treble, and volume.

The data processor (not shown) in the first processor 170 may perform data processing on a demultiplexed data signal. For example, if the demultiplexed data signal is a coded data signal, the data processor (not shown) may decode the data signal. The coded data signal may be electronic program guide (EPG) information containing broadcast information such as a start time and end time of a broadcast program broadcast on each channel.

The block diagram of the first processor 170 shown in FIG. 3 is simply illustrative. Constituents of the block diagram may be integrated, added or omitted according to the specification of the first processor 170 which is implemented in reality.

In particular, the frame rate converter 350 and the formatter 360 may not be provided in the first processor 170. Instead, they may be provided individually or provided as one separate module.

Figure 4:
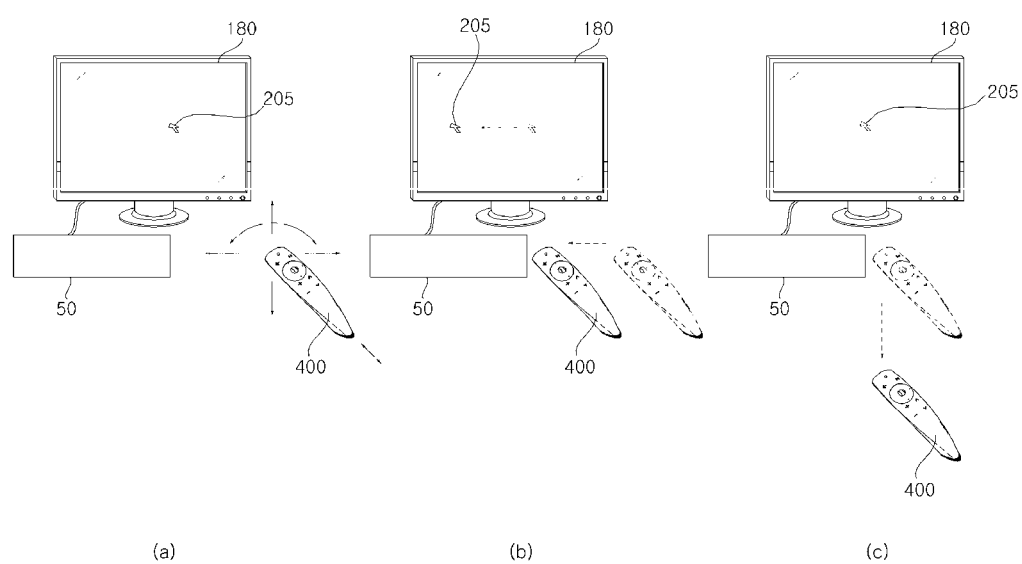
FIG. 4 illustrates a method for controlling the remote control device of FIG. 2.

FIG. 4 illustrates a method for controlling the remote control device of FIG. 2.

As shown in FIG. 4(a), a pointer 205 corresponding to the remote control device 400 may be displayed on the display 180.

The user may move the remote control device 400 up and down, left and right (FIG. 4(b)), or back and forth (FIG. 4(c)) or rotate the same. The pointer 205 displayed on the display 180 of the image providing apparatus corresponds to movement of the remote control device 400. As shown in the figure, since the pointer 205 moves according to movement of the remote control device 400 in the 3D space, the remote control device 400 may be referred to as a spatial remote control or a 3D pointing device.

FIG. 4(b) illustrates a case where the pointer 205 displayed on the display 180 moves to the left when the user moves the remote control device 400 to the left.

Information corresponding to movement of the remote control device 400 sensed through a sensor of the remote control device 400 is transmitted to the image providing apparatus. The image providing apparatus may calculate coordinates of the pointer 205 based on the information corresponding to the movement of the remote control device 400. The image providing apparatus 50 may provide the pointer 205 such that the pointer 205 corresponds to the calculated coordinates. Thereby, the pointer 205 may be displayed on the display 180.

FIG. 4(c) illustrates a case where the user moves the remote control device 400 away from display 180 while pressing down a specific button in the remote control device 400. In this case, a selected area on the display 180 corresponding to the pointer 205 may be zoomed in and displayed with the size thereof increased. On the other hand, when the user moves the remote control device 400 closer to the display 180, the selected area may be zoomed out and displayed with the size thereof reduced. Alternatively, the selected area may be zoomed out when the remote control device 400 moves away from the display 180, and may be zoomed in when the remote control device 400 moves closer to the display 180.

Vertical and lateral movement of the remote control device 400 may not be recognized while the specific button in the remote control device 400 is pressed down. That is, when the remote control device 400 approaches or moves away from the display 180, vertical and lateral movements thereof may not be recognized, but only back-and-forth movement thereof may be recognized. If the specific button in the remote control device 400 is not pressed down, only the pointer 205 moves according to vertical and lateral movements of the remote control device 400.

The speed and direction of movement of the pointer 205 may correspond to the speed and direction of movement of the remote control device 400.

The user input interface unit 150 may receive a pointing signal from the remote control device 400, and the first processor 170 may provide the pointer 205 based on the received pointing signal, as shown in FIGS. 4(a) to 4(c).

Figure 5:
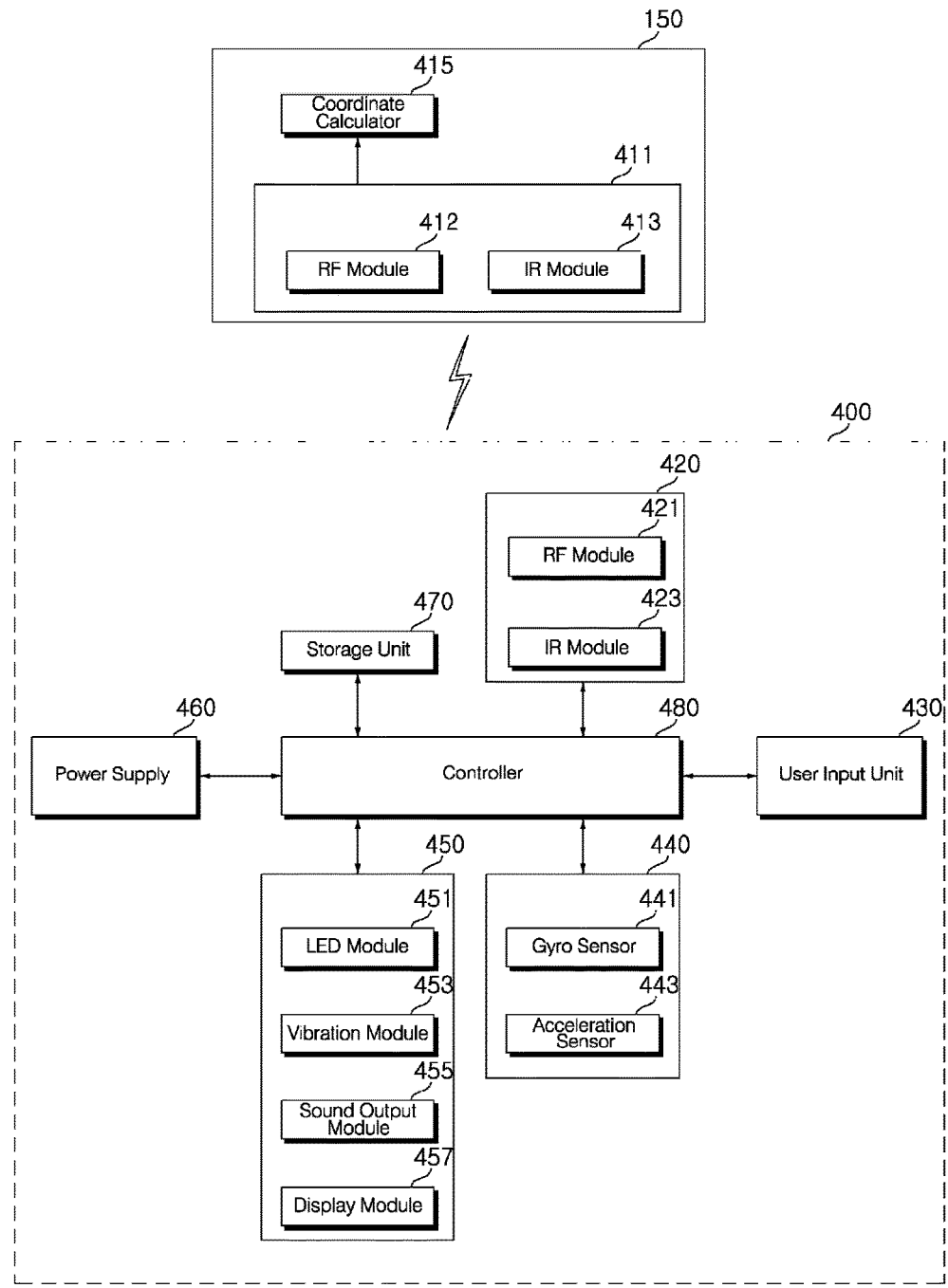
FIG. 5 is an internal block diagram illustrating the remote control device of FIG. 2.

FIG. 5 is an internal block diagram illustrating the remote control device of FIG. 2.

Referring to FIG. 4B, the remote control device 400 may include a wireless communication unit 425, a user input unit 435, a sensor unit 440, an output unit 450, a power supply 460, a storage unit 470, and a controller 480.

The wireless communication unit 425 may transmit and receive signals to and from the image providing apparatus 50 according to embodiments of the present invention described above.

For example, the remote control device 400 may include an RF module 421 capable of transmitting and receiving signals to and from the image providing apparatus 50 according to an RF communication standard. The remote control device 400 may further include an IR module 423 capable of transmitting and receiving signals to and from the image providing apparatus 50 according to an IR communication standard.

The remote control device 400 may transmit a signal containing information corresponding to movement of the remote control device 400 to the image providing apparatus 50 via the RF module 421.

In addition, the remote control device 400 may receive a signal from the image providing apparatus 50 via the RF module 421. When necessary, the remote control device 400 may transmit commands related to power on/off, channel change, and volume change to the image providing apparatus 50 via the IR module 423.

The user input unit 435 may include a keypad, a button, a touchpad, or a touchscreen. The user may input a command related to the image providing apparatus 50 by manipulating the user input unit 435. If the user input unit 435 includes a hard key button, the user may input a command related to the image providing apparatus 50 by pressing the hard key button. If the user input unit 435 includes a touchscreen, the user may input a command related to the image providing apparatus 50 by touching a soft key on the touchscreen. The user input unit 435 may include various kinds of input means such as a scroll key and a jog key which are manipulatable by the user, but it should be noted that this embodiment does not limit the scope of the present invention.

The sensor unit 440 may include a gyro sensor 441 or an acceleration sensor 443. The gyro sensor 441 may sense information corresponding to movement of the remote control device 400.

For example, the gyro sensor 441 may sense information corresponding to movement of the remote control device 400 with respect to the X, Y and Z axes. The acceleration sensor 443 may sense information corresponding to the movement speed of the remote control device 400. The sensor unit 440 may further include a distance measurement sensor to sense a distance to the image providing apparatus 50 or the display 180.

The output unit 450 may output an image signal or voice signal corresponding to manipulation of the user input unit 435 or a signal transmitted from the image providing apparatus 50. The user may recognize, via the output unit 450, whether the user input unit 435 is manipulated or the image providing apparatus 50 is controlled.

For example, the output unit 450 may include an LED module 451 configured to be turned on when signals are transmitted to and received from the image providing apparatus 50 via the wireless communication unit 425, a vibration module 453 configured to generate vibration, a sound output module 455 configured to output sound, or a display module 457 configured to output an image.

The power supply 460 supplies power to the remote control device 400. If the remote control device 400 does not move for a predetermined time, the power supply 460 may stop supplying power to save power. The power supply 460 may resume supply of power when the predetermined key provided to the remote control device 400 is manipulated.

The storage unit 470 may store various kinds of programs and application data necessary for control or operation of the remote control device 400. When the remote control device 400 wirelessly transmits and receives signals to and from the image providing apparatus 50 via the RF module 421, the remote control device 400 and the image providing apparatus 50 may transmit and receive signals in a predetermined frequency band. The processor 480 of the remote control device 400 may store, in the storage unit 470, information about, for example, a frequency band enabling wireless transmission and reception of signals to and from the image providing apparatus 50 which is paired with the remote control device 400, and reference the same.

The processor 480 controls overall operations related to control of the remote control device 400. The processor 480 may transmit, via the wireless communication unit 425, a signal corresponding to manipulation of a predetermined key in the user input unit 435 or a signal corresponding to movement of the remote control device 400 sensed by the sensor unit 440 to the image providing apparatus 50.

The user input interface unit 150 of the image providing apparatus 50 may include a wireless communication unit 151 capable of wirelessly transmitting and receiving signals to and from the remote control device and a coordinate calculator 415 capable of calculating coordinates of the pointer corresponding to operation of the remote control device 400.

The user input interface unit 150 may wirelessly transmit and receive signals to and from the remote control device 400 via an RF module 412. In addition, the user input interface unit 150 may receive, via an IR module 413, a signal transmitted from the remote control device 400 according to an IR communication standard.

The coordinate calculator 415 may calculate coordinates (x, y) of the pointer 202 to be displayed on the display 180, by correcting the unstable position of a hand or an error in a signal corresponding to operation of the remote control device 400 which is received via the wireless communication unit 151.

The transmitted signal of the remote control device 400 input to the image providing apparatus 50 via the user input interface unit 150 is transmitted to the processor 180 of the image providing apparatus 50. The processor 180 may determine information corresponding to an operation of the remote control device 400 or manipulation of a key from the signal transmitted from the remote control device 400, and control the image providing apparatus 50 according to the information.

As another example, the remote control device 400 may calculate coordinates of the pointer corresponding to movement thereof and output the same to the user input interface unit 150 of the image providing apparatus 50. In this case, the user input interface unit 150 of the image providing apparatus 50 may transmit, to the processor 180, information corresponding to the received coordinates of the pointer without separately correcting the unstable position of the hand or error.

As another example, in contrast with the example of the figure, the coordinate calculator 415 may be provided in the first processor 170 rather than in the user input interface unit 150.

Figure 6:
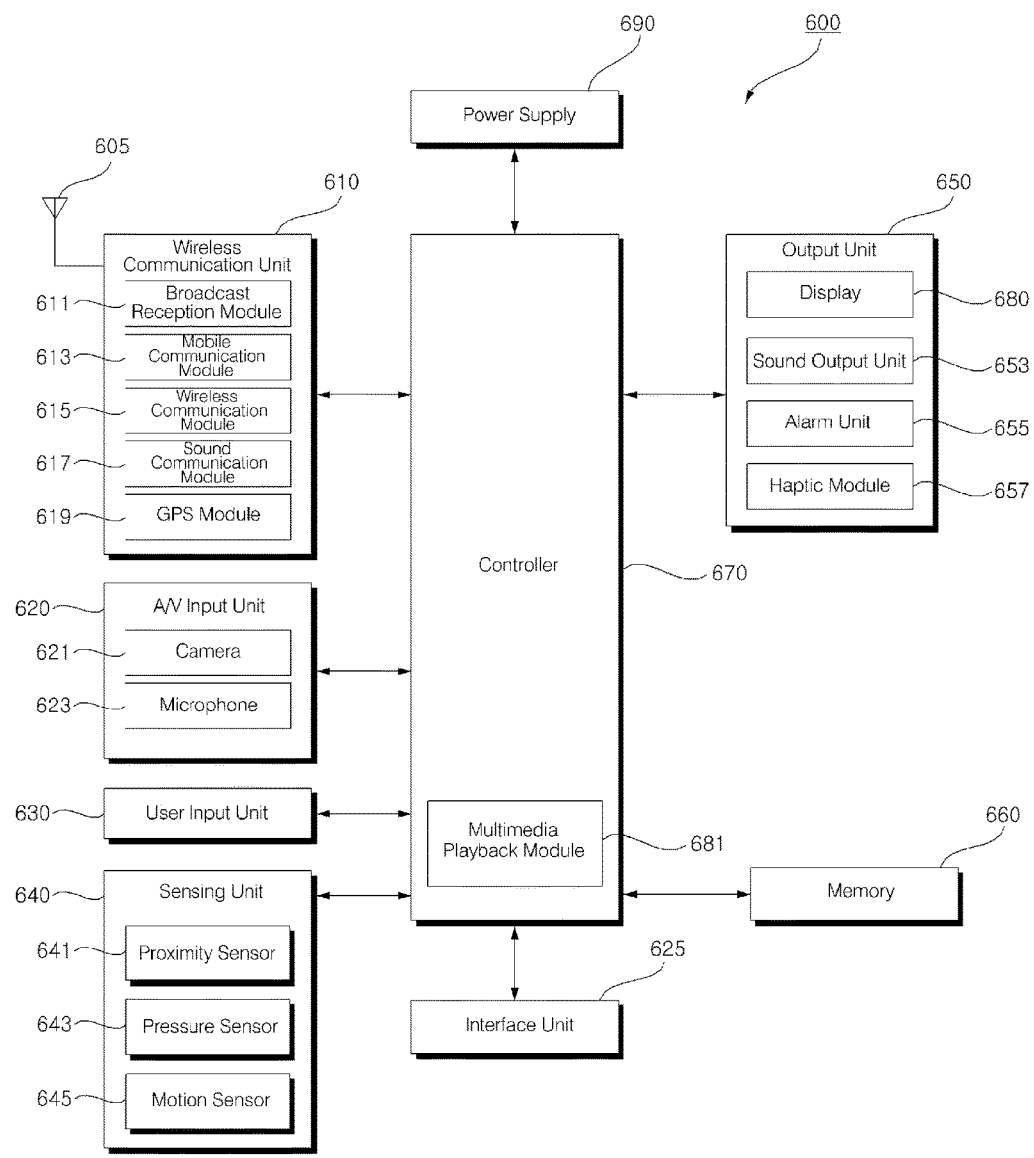
FIG. 6 is an internal block diagram illustrating the terminal of FIG. 1.

FIG. 6 is an internal block diagram illustrating the terminal of FIG. 1.

Referring to the figure, the terminal 600 may include a mobile terminal which is movable.

The mobile terminal 600 may include a wireless communication unit 610, an audio/video (A/V) input unit 620, a user input unit 630, a sensing unit 640, and an output unit 650, a memory 660, an interface unit 625, a controller 670 and a power supply 690.

The wireless communication unit 610 may include a broadcast reception module 611, a mobile communication module 613, a wireless Internet module 615, a sound communication unit 617, and a GPS module 619.

The broadcast reception module 611 may receive at least one of a broadcast signal and broadcast-related information from an external broadcast management server over a broadcast channel. Herein, the broadcast channel may include a satellite channel and a terrestrial channel.

The broadcast signal and/or broadcast-related information received through the broadcaster reception module 611 may be stored in the memory 660.

The mobile communication module 613 transmits and receives a radio signal to and from at least one of a base station, an external terminal and a server over a mobile communication network. Herein, the wireless signal may include a voice call signal, a video call signal, or various kinds of data according to transmission and reception of a text/multimedia message.

The wireless Internet module 615, which refers to a module for wireless Internet access, may be installed inside or outside the mobile terminal 600. For example, the wireless Internet module 615 may perform Wi-Fi-based wireless communication or Wi-Fi Direct-based wireless communication.

The sound communication unit 617 may perform sound communication. In the sound communication mode, the sound communication unit 617 may add data of predetermined information to audio data which is to be output and output sound. In addition, in the sound communication mode, the sound communication unit 617 may extract data of predetermined information from received sound. For details, see FIGS. 4(*a*) to 4(*c*)

Available short-range communication technologies may include Bluetooth, RFID (radio frequency identification), IrDA (Infrared Data Association), UWB (Ultra Wideband) and ZigBee.

The GPS module 619 may receive location information from a plurality of GPS satellites.

The A/V input unit 620 is used for input of an audio signal or a video signal and may include a camera 621 and a microphone 623.

The user input unit 630 generates key input data input by the user to control operation of a terminal of the user. To this end, the user input unit 630 may include a keypad, a dome switch, and a touchpad (resistive touchpad/capacitive touchpad). In particular, the touchpad may form a layered architecture together with the display 180, thereby realizing a touchscreen.

The sensing unit 640 may generate a sensing signal for controlling operation of the mobile terminal 600 by sensing the current state of the mobile terminal 600, for example by sensing whether the mobile terminal 600 in the open or closed position, where the mobile terminal 600 is located, and whether the user contacts the mobile terminal 600.

The sensing unit 640 may include a haptic sensor 641, a pressure sensor 643 and a motion sensor 645. The motion sensor 645 may employ an acceleration sensor, a gyro sensor, a gravity sensor and the like to sense movement or location of the mobile terminal. In particular, the gyro sensor, which is used to measure an angular speed, may sense orientation (angle) of the mobile terminal with respect to a reference direction.

The output unit 650 may include a display 680, an audio output unit 653, a alarm unit 655, and a haptic module 657.

The display 680 outputs and displays information processed by the mobile terminal 600.

As described above, if the display 680 forms a layered architecture with the touchpad to implement a touchscreen, the display 680 may be used not only as an output device but also as an input device for input of information according to a touch from the user.

The audio output unit 653 outputs audio data received from the wireless communication unit 610 or stored in the memory 660. The audio output unit 653 may include a speaker and a buzzer.

The alarm unit 655 outputs a signal for reporting occurrence of an event in the mobile terminal 600. For example, the alarm unit 655 may output a signal in the form of vibration.

The haptic module 657 generates various haptic effects which may be felt by the user. A typical example of the haptic effects generated by the haptic module 657 is vibration.

The memory 660 may store a program for processing and control of the controller 670, and functions to temporarily store input data or output data (e.g., a phonebook, a message, a still image, a moving image, etc.).

The interface unit 625 serves as an interface for all devices connected to the mobile terminal 600. The interface unit 625 may serve to receive data or power from external devices and transfer the same to the internal constituents of the mobile terminal 600 and to transmit data from the mobile terminal 600 to external devices.

The controller 670 typically controls operations of the aforementioned respective elements, thereby controlling overall operation of the mobile terminal. For example, the controller 670 may perform control or processing related to voice communication, data communication, video communication, and the like. The controller 670 may also include a multimedia playback module 681 to reproduce multimedia. The multimedia playback module 681 may be provided in the controller 670 as hardware or may be configured separately from the controller 670.

The power supply 690 supplies power necessary for operations of the respective constituents according to control of the controller 670 when external power or internal power is applied thereto.

The block diagram of the mobile terminal 600 shown in FIG. 5 is simply illustrative. The respective constituents of the block diagram may be integrated, added or omitted according to the specification of the mobile terminal 600 which is implemented in reality. That is, two or more constituents may be combined into one constituent, or one constituent may be subdivided into two or more constituents, when necessary. In addition, the function performed in each block is simply illustrative, and it should be noted that specified operations or devices of the blocks do not limit the scope of the present invention.

FIGS. 7A to 18 illustrate operation of the image providing system of FIG. 1.

FIG. 7A is an internal block diagram illustrating the terminal 600, image providing apparatus 50 and server 500 in the image providing system of FIG. 1.

The server 500 may include an interface unit 530, a processor 570, and a memory 540.

The interface unit 530 exchanges data with the terminal 600 or the image providing apparatus 50.

For example, the interface unit 530 may receive a connection request from the terminal 600, transmit, to the terminal 600, information for connecting to a personal server, receive login information from the terminal 600, transmit personal server list information corresponding to the login information to the terminal 600, receive a request for information corresponding to a specific personal server in a personal server list from the terminal 600, and transmit, to the terminal 600, network information for the specific personal server.

In addition, the interface unit 530 may receive network information from the image providing apparatus 50. In particular, the interface unit 530 may frequently receive network information from the image providing apparatus 50. For example, the interface unit 530 may receive the network information of the image providing apparatus by connecting to the image providing apparatus whenever the image providing apparatus is turned on. At this time, the processor 570 may control the memory 540 to be updated with the received network information.

In addition, the interface unit 530 may receive sharable personal server information from the image providing apparatus 50. The personal server information may include the name of a person server and a list of sharable contents.

The processor 570 may allocate an account ID to the image providing apparatus 50, based on the received device information of the image providing apparatus, and control the receive network information of the image providing apparatus to be stored in the memory 540.

The processor 570 may control a server connection screen or information for server connection to be provided to the terminal 600 according to a web address from the terminal 600.

When login information is received from the terminal 600, the processor 570 may perform a control operation to provide corresponding personal server list information to the terminal 600 based on the login information.

When a request for network information corresponding to a specific personal server in the personal server list is received from the terminal 600, the processor 570 may perform a control operation to transmit, to the terminal 600, network information corresponding to the specific personal server, namely public IP information and private IP information. The processor 570 may also perform a control operation to further transmit device information and account information (account ID).

Meanwhile, the server 500 may frequently connect to the image providing apparatus 50 to receive network information corresponding to the personal server, namely the image providing apparatus 50 and perform a control operation to execute update with the network information.

When login information is received from the terminal, the processor 570 may perform a control operation to transmit advertisement information to the terminal, along with the personal server list information.

The processor 570 may provide the advertisement information when it provides information for connection to a personal server. In addition, after being logged in, the server 500 may provide the advertisement information along with the personal server information.

The processor 570 may provide first advertisement information to the terminal 600 before receiving login information from the terminal 600. After receiving the login information from the terminal 600, the processor 570 may provide second advertisement information, different from the first advertisement information, to the terminal 600. Herein, the second advertisement information may include advertisement information based on the login information.

The processor 570 may vary the type and attributes of the provided advertisement information depending on whether logging has been performed or not. That is, after logging is performed, the processor 570 may perform a control operation to provide customized advertisement information to the user.

The processor 570 may be equipped therein with a service 531 for, for example, device registration. The processor 570 may transmit device registration/update information to the memory 540 according to the service 531, and receive device status information from the memory 540. Herein, the device status information may conceptually include device information, account information (account ID), network information, and device on/off information.

The processor 570 may perform a control operation to further transmit the device information and account information of the image providing apparatus to the terminal 600 when transmitting network information.

When transmitting personal server list information, the processor 570 may further transmit recommended content list to the terminal.

The memory 540 may store login information corresponding to a person, device information of the image providing apparatus, server list information corresponding to login information, and network information corresponding to the respective personal servers. In particular, the memory 540 may store data network information. Herein, the network information may include the aforementioned public IP information and private IP information.

The image providing apparatus 50 is an apparatus capable of operating as a personal server and providing image-related content to external devices.

To this end, the image providing apparatus 50 may include a first circuit board 100, which is a TV board, and a second circuit board 200, which is a PC board.

The first circuit board 100 may include a broadcast receiver 105, the first processor 170, and a first interface unit 125.

The broadcast receiver 105 receives broadcasting. To this end, the broadcast receiver 105 may include a tuner or a network interface unit. That is, the broadcast receiver 105 may receive a terrestrial broadcast signal and a cable broadcast signal through the tuner, or receive a streaming broadcast signal through the network interface unit.

The first processor 170 may control a constituent unit in the first circuit board 100. In particular, the first processor 170 may perform signal processing on a broadcast signal received from the broadcast receiver 105. For example, the first processor 170 may extract a data signal, a video signal, an audio data signal from the broadcast signal, or perform decoding of the video data and audio data and the scaling of video data.

The first processor 170 may include a DASY 171, which is a DVR engine serving as a middleware module for implementation of DVR operation and controlling all relevant functions for recording digital broadcast programs and playing back the broadcast programs.

The first interface unit 125 performs data exchange between the first circuit board 100 and second circuit board 200. For example, data communication according to the HDMI standard may be performed between the first circuit board 100 and the second circuit board 200.

The first interface unit 125 may deliver a signal-processed broadcast signal to the second circuit board 200.

The second circuit board 200 may include a second interface unit 225, a second processor 270, a second external device interface unit 230, and a second storage unit 240.

The second interface unit 225 performs data exchange between the first circuit board 100 and the second circuit board 200. For example, the second interface unit 225 may receive a signal-processed broadcast signal from the first circuit board 100.

The first processor 170 may control a constituent unit in the second circuit board 200. In particular, the first processor 170 may perform a control operation to store, in the second storage unit 240, a signal-processed broadcast signal received through the second interface unit 225 or transmit the same through the second external device interface unit 230.

For example, the first processor 170 may perform a control operation to transmit a signal-processed broadcast signal received from the first circuit board 100 in real time or to store the same in the second storage unit 240.

As another example, the first processor 170 may perform a control operation to transmit contents stored in the second storage unit 240, for example, broadcast content, music content, movie content, document content, and the like. Thereby, other devices may share the corresponding content.

To implement real-time data transmission or data sharing, the second processor 170 may include a stream manager 271, a streaming server 272, a transcoder 273, a broadcast information collector 274, and a player 276.

The second processor 270 may receive a live broadcast stream from the TV Board 100, and transmit the received live broadcast stream to the player 276, or a streaming engine.

The streaming server 272 may be an HTTP live streaming (HLS) server. The streaming server 272 may include an engine for providing a content streaming service for live streaming.

The transcoder 273 may transcode data according to user input in the terminal 600 or the image providing apparatus 50, specifically, according to a TV/PVR service request. For example, the transcoder 273 may code the data as an MP4 file.

The broadcast information collector 274 collects broadcast information. To this end, the broadcast information collector 274 may include an EPG aggregator service unit.

The broadcast information collector 274 may collect EPG including a digital broadcast signal. Additionally, if the EPG is not contained in the broadcast signal, the broadcast information collector 274 may collect broadcast information over a network by connecting to a server of a broadcast provider who provides live broadcasting.

The player 276, which is a unit for playing contents, may reproduce a live broadcast signal (TV signal) or reproduce PVR contents stored in the second storage unit 240.

The second storage unit 240 may store live broadcast signals using a sonal video recorder (PVR) technique. The second storage unit 240 may also store music content, movie content, document content, and the like, in addition to broadcast contents such as the live broadcast signal.

In addition, the second storage unit 240 may output corresponding data according to a user input in the terminal 600 or the image providing apparatus 50, particularly, according to a TV/PVR service request.

The second external device interface unit 230 may exchange data with the server 500 or the terminal 600.

The second external device interface unit 230 may transmit device information, network information and the like to the server in performing product registration of the image providing apparatus or in performing registration in a personal server, and receive account information (account ID) allocated by the server 500.

When remotely connected to the terminal 600, the second external device interface unit 230 may transmit, to the terminal 600, a shared content list in the image providing apparatus 50 and a broadcast content selected in the list according to a request from the terminal 600. Thereby, even external devices are allowed to share and play the content.

The terminal 600 may include a display 681.

The display 681 may include an input window 681 for inputting a Web address, a scan area 682 for providing a screen for connection to a personal server or a personal server list screen, and an advertisement area 683.

The screen for connection to a personal server or a personal server list screen may be displayed based on the information received from the server 500. Advertisement information displayed in the advertisement area 683 may also be displayed based on the information received from the server 500.

Figure 7B:
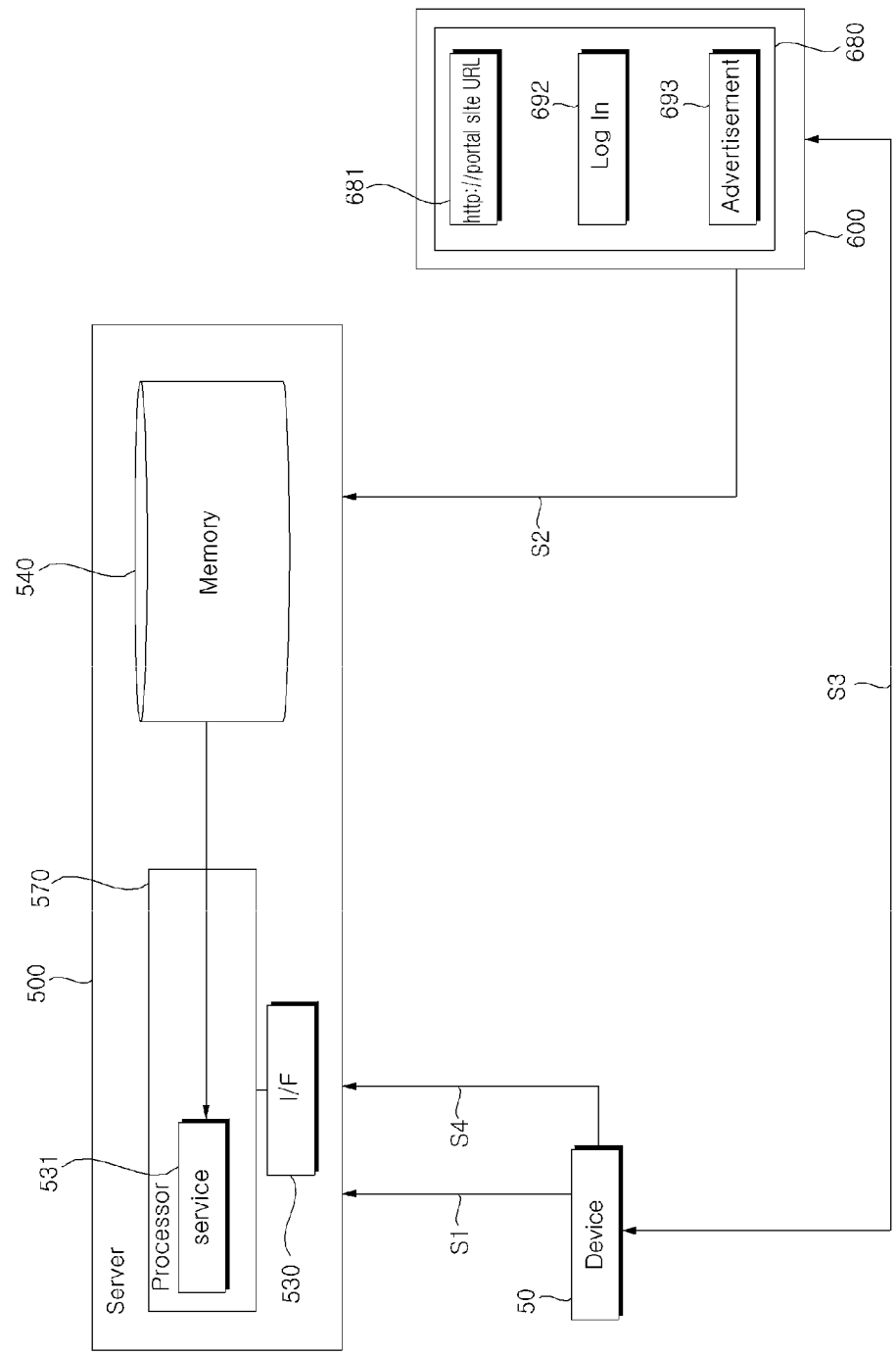
FIGS. 7A to 18 illustrate operation of the image providing system of FIG. 1.

Next, FIG. 7B illustrates registration of the image providing apparatus in server and connection of the image providing apparatus via a terminal.

To perform product registration, the image providing apparatus 50 transmits a first signal S1 to the server 500. The first signal S1 may include device information and network information.

The server 500 may store the received device information and network information in the memory 540 and perform product registration.

Next, if a web address of the server 500 is input in the input window 681 while a web browser is run on the terminal 600, the terminal 600 transmits a second signal S2 to the server 500. The second signal S2 may include a connection request signal.

In response to the connection request signal, the server 500 may transmit, to the terminal 600, information for connection to the personal server or a screen for connection to the personal server.

Alternatively, if login information is input while the terminal 600 is connected to the server 500, the terminal 600 transmits the second signal S2 to the server 500. In this case, the second signal S2 may include the login information.

In response to the login information, the server 500 may transmit, to the terminal 600, personal server list information or a personal server list screen.

Alternatively, if a specific personal server item is selected from the displayed personal server list after the terminal 600 is connected to the server 500, the terminal 600 transmits the second signal S2 to the server 500. In this case, the second signal S2 may include a request for information corresponding to the selected personal server.

In response to the request for information corresponding to the selected personal server, the server 500 may transmit network information including public IP information and private IP information corresponding to the personal server to the terminal 600. Additionally, the server 500 may transmit device information and account information (account ID).

Using the received network information, the terminal 600 may connect to the personal server, namely the image providing apparatus 50. To this end, the terminal 600 may transmit a third signal S3 to the image providing apparatus 50 using the received network information. The third signal S3 may include a connection request signal.

In response to the connection request signal, the image providing apparatus 50 may transmit shared content list information to the terminal 600. When a content is selected, the image providing apparatus 50 may transmit the content. The image providing apparatus 50 may play the content and transmit a stream of the content.

In addition, the terminal 600 may receive the shared content list information from the connected image providing apparatus 50, and display a shared content list screen. If the user selects a content from the list, the terminal 600 may make a request for transmission of the content to the connected image providing apparatus 50, and receive the content. In particular, the terminal 600 may receive a played stream of the content.

Thereby, the user of the terminal 600 which is remotely connected to the image providing apparatus 50, which is a personal server, may receive the desired content and easily view the same. Accordingly, user convenience may be enhanced.

FIG. 8 illustrates a case where a web browser is executed on the terminal 600, and a web browser screen 803 including a Web address input window 805 is display on the display 680.

When a web address such as "182.255.22.48/index.html" is entered in the Web address input window 805, a server connection screen 810 provided by the RAC server 500 may be displayed on the display 680.

The server connection screen 810 is a screen for providing a personal server service, may include a login object 811 for logging.

In addition to the server connection-related information, the terminal 600 may receive advertisement information from the server 500. Thereby, the server connection screen 810 and an advertisement screen 820 may be displayed simultaneously. When a specific advertisement item is selected on the advertisement screen 820, an advertisement webpage may be displayed.

A soft key area 825 for going back to the previous item, the home screen, execution of a specific menu may be disposed at the bottom are of the display 680 of the terminal 600.

Figure 8A:
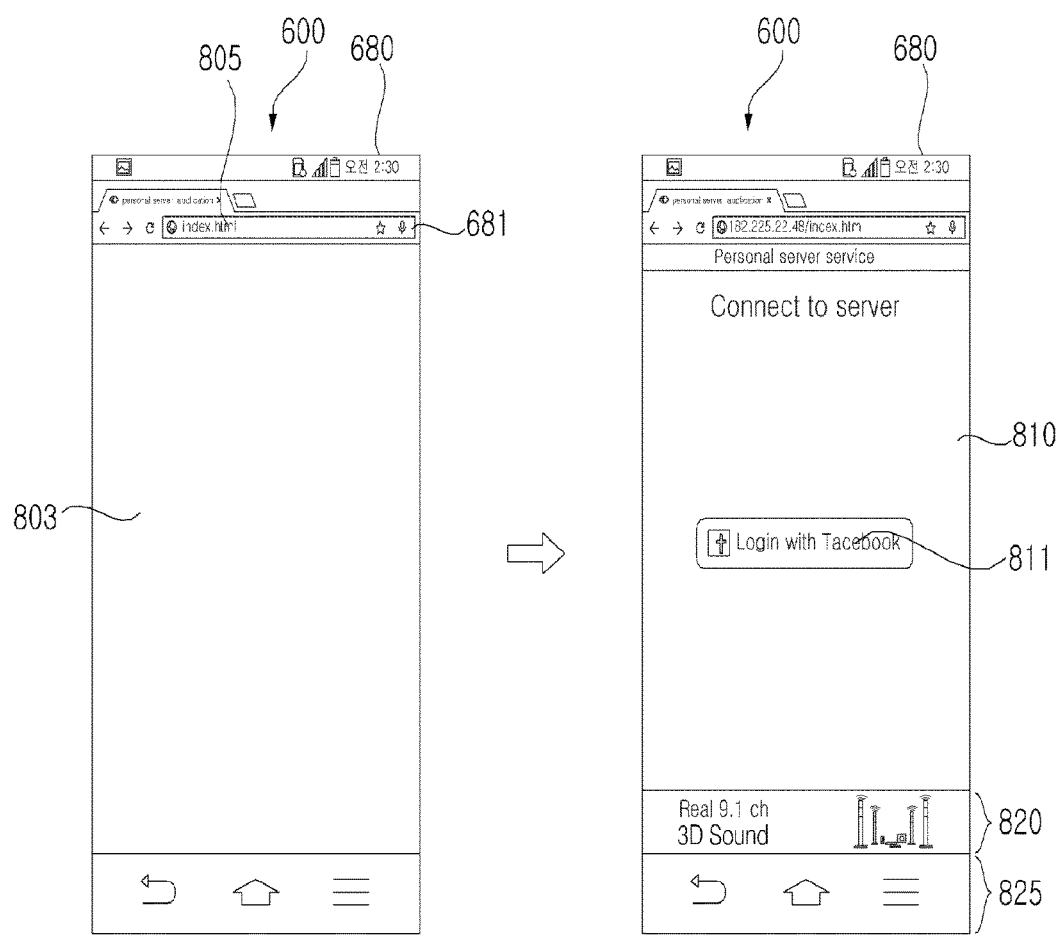
Figure 8B:
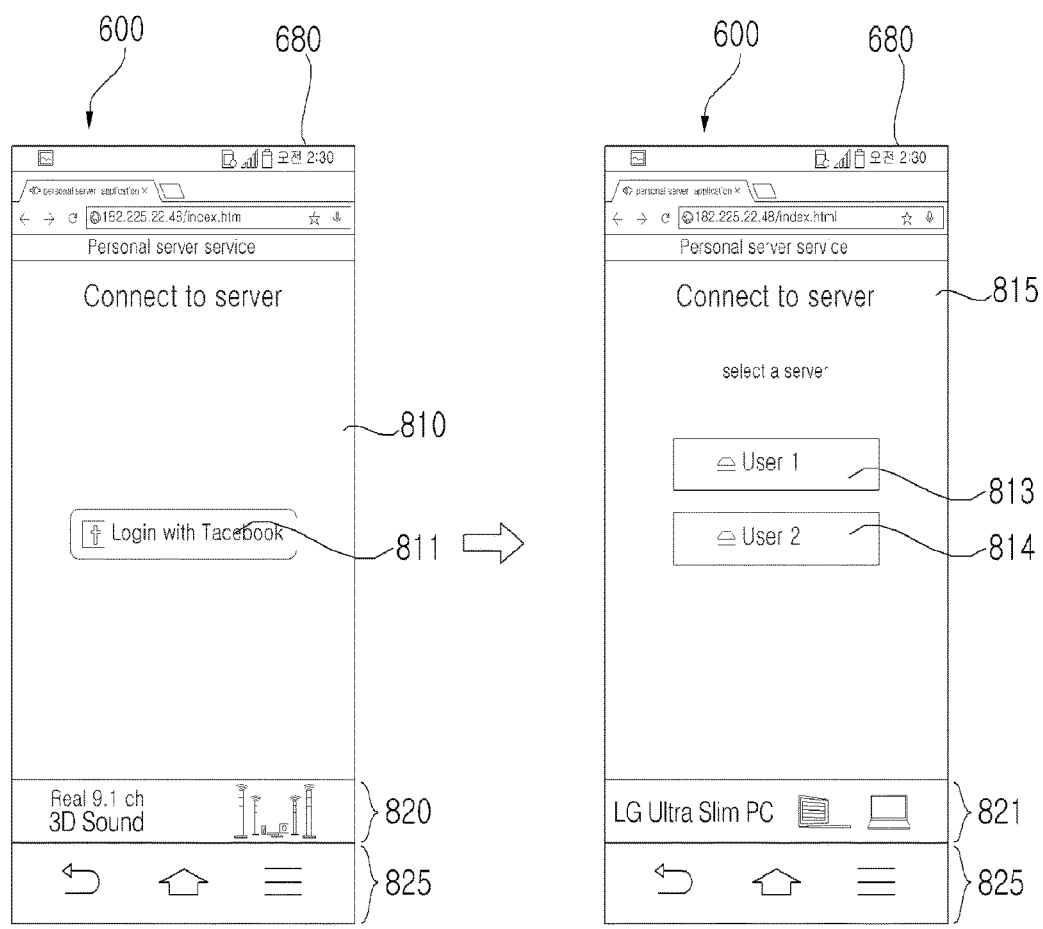

FIG. 8B illustrates a case where logging is performed on the server connection screen 810, and thus the personal server list screen 815 is displayed on terminal 600.

When the login window is displayed, login information may be input using a login object 811, and the terminal 600 may transmit the input login information to the server 500.

Then, the server 500 may transmit personal server list information to the terminal 600, and the terminal 600 may display the personal server list screen 815 using the received personal server list information, as shown in the figure.

That is, after logging in to the server 500 is performed, the terminal 600 may display the personal server list screen 815.

In the figure, the personal server list includes two items, i.e., "Use 1" 813 and "User 2" 814 as an example. In this case, the personal server list is a list of servers whose data is sharable by the logged-in user. The personal server list may include the personal server of the user and a personal server of another user.

For example, information corresponding to the personal server of another user is configured to be shared by the logged-in user, a personal server list of another user may also be displayed on the personal server list screen 815.

In addition to the personal server list information, the terminal 600 may additionally receive advertisement information from the server 500. Thereby, the personal server list screen 815 and an advertisement screen 821 may be displayed simultaneously. When a specific advertisement item is selected in the advertisement screen 821, an advertisement webpage may be displayed.

Preferably, the advertisement screen 820 of FIG. 8A, which is an advertisement screen prior to logging in to the server 500, is different from the advertisement screen 821 of the terminal 600 of FIG. 8B, which is an advertisement screen after logging in to the server 500. In particular, after logging, the server 500 may provide customized advertisement information to the user. Thereby, user convenience may be enhanced.

Figure 8C:
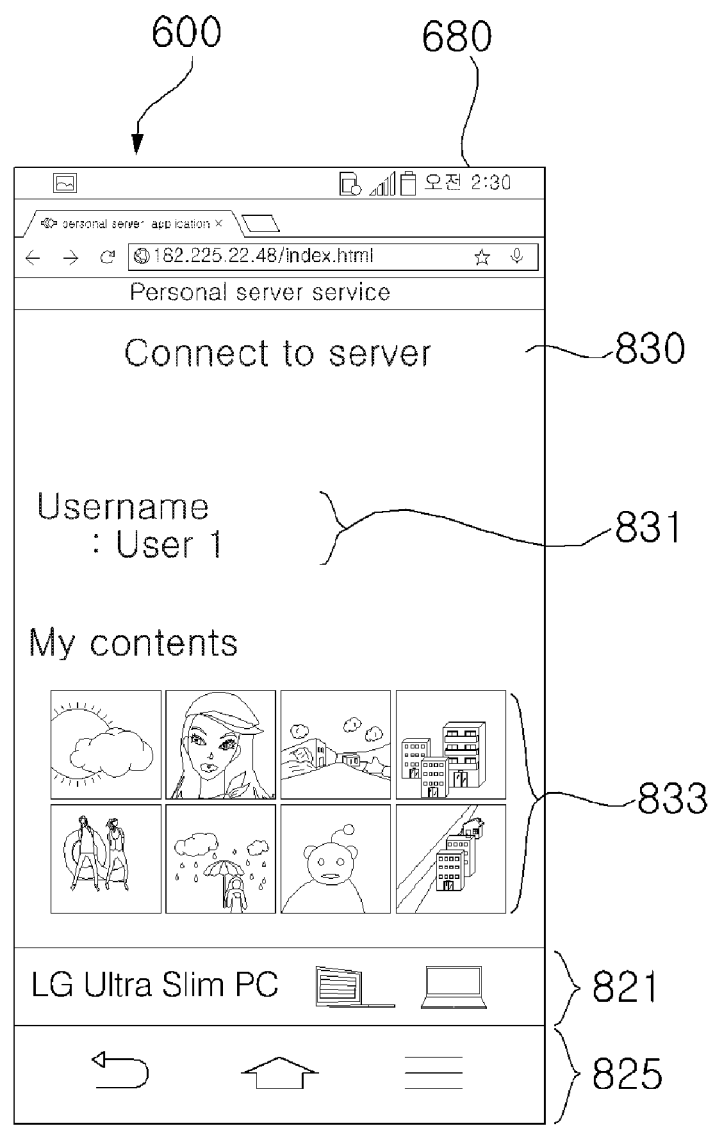

FIG. 8C illustrates a case where a specific personal server list is selected in the server connection screen 810, and thus the personal server screen 830 is displayed on the terminal 600.

In FIG. 8B, when "Use 1" 813 is selected, the terminal 600 may make a request to the server 500 for information corresponding to a personal server corresponding to "Use 1". In response to the personal server request, the server 500 may transmit, to the terminal 600, network information corresponding to the personal server corresponding to "Use 1". Additionally, the terminal 600 may further transmit device information and account information (account ID).

The terminal 600 may use network information of a personal server corresponding "Use 1", namely the server 500 to connect to the personal server corresponding "Use 1", and receive a list related to shared contents from the personal server corresponding to "Use 1", namely the server 500.

The terminal 600 may display, on the display 680, a personal server screen 830 including a shared content-related list 833. Thereby, a content list which may be provided from the personal server may be easily checked through the terminal 600.

Herein, the shared content-related list 833 may include a thumbnail image indicating the shared content.

In addition to the shared content-related list 833, the advertisement screen 820 may further include personal server name information 831.

The terminal 600 may display the advertisement screen 821 containing advertisement information received from the server 500 and the personal server screen 830 simultaneously.

Figure 8D:
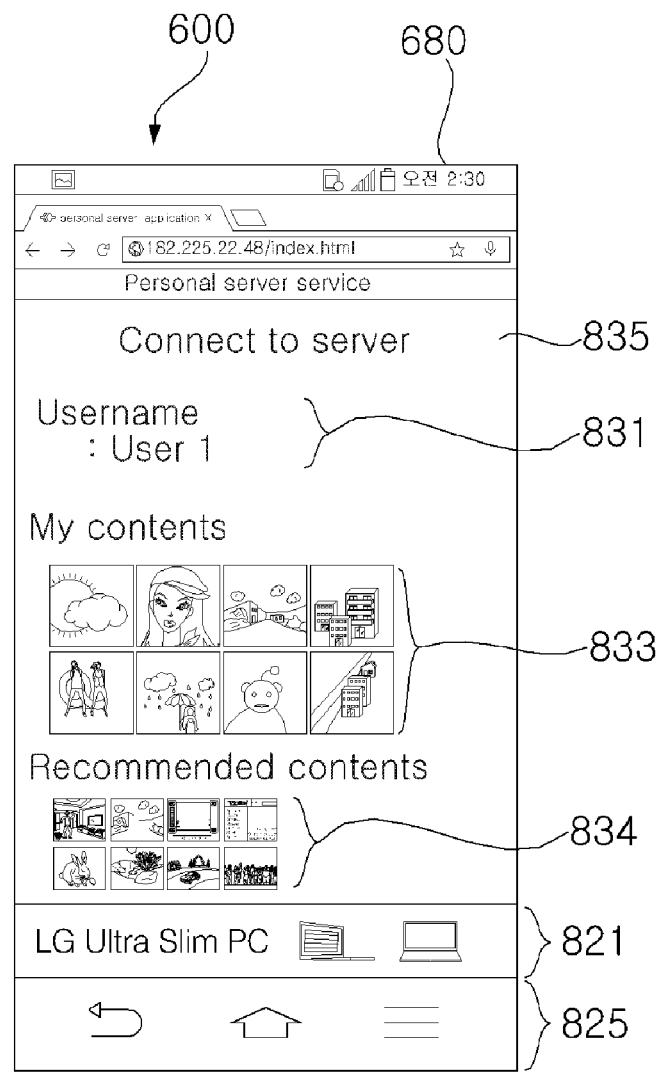

FIG. 8D illustrates another example of a personal server screen.

Compared to the configuration of FIG. 8C, the personal server screen 893 of FIG. 8D may further include a recommended content list 834.

Herein, the recommended content list 834 may include a thumbnail image indicating a recommended content.

The personal server, namely the server 500 may further transmit a recommended content list to the terminal 600, in addition to the shared content-related list.

Then, the terminal 600 may display the personal server screen 830 including the recommended content list 834 on the display 680, along with the shared content-related list 833.

The recommended content list may be received from the personal server, namely the server 500, and may also be separately provided from the server 500.

Figure 8E:
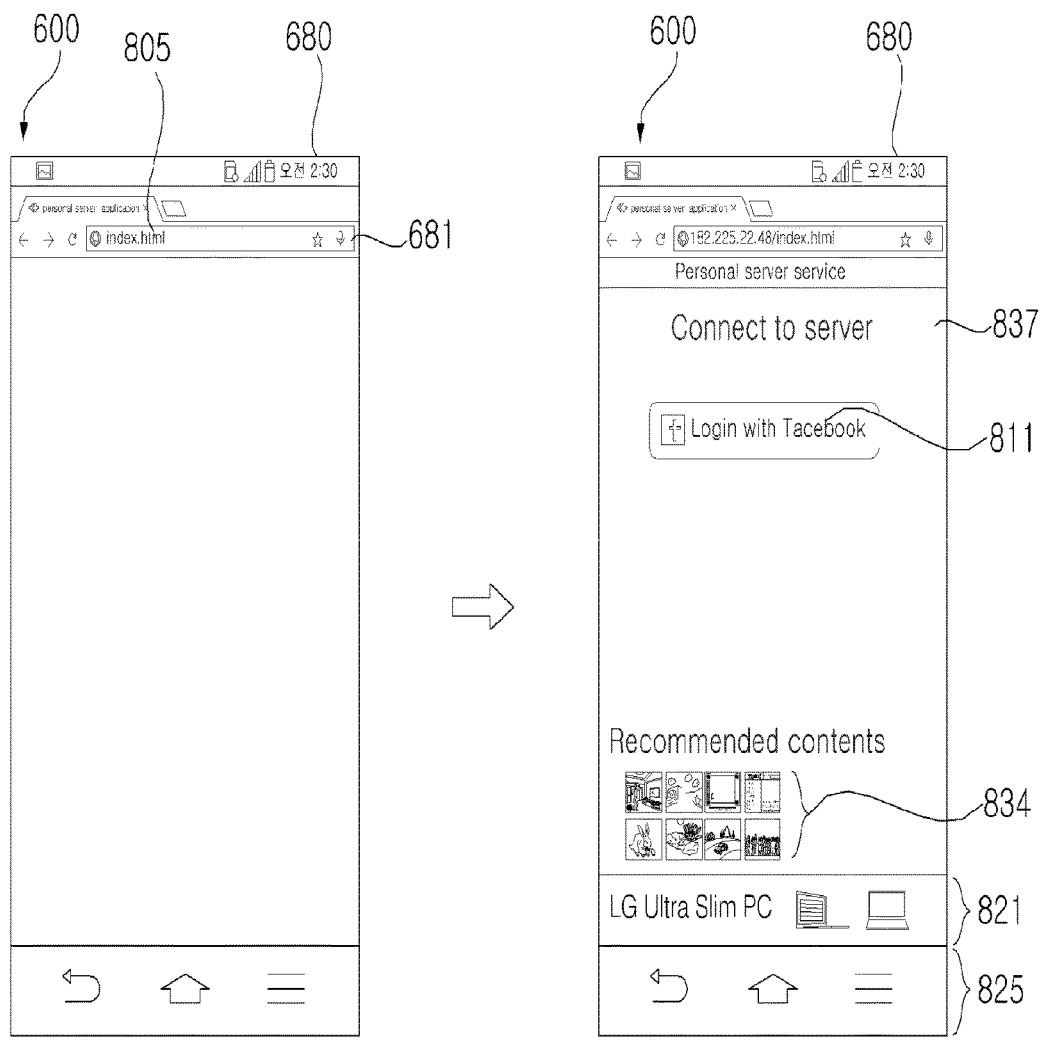

FIG. 8e illustrates a case where a recommended content list 834 as well as the login object 811 is displayed in the server connection screen 837.

In FIG. 8E, the server connection screen 837 is a screen prior to a logging in to the server 500, and the displayed recommended content list 834 may be a recommended content list for multiple users rather than of personalized content. That is, the list may be a list of contents preferred by multiple users.

That is, the recommended content list 834 of FIG. 8E is a content list for multiple users. The recommended content list 834 of FIG. 8D is differentiated in that it is a content list for a logged-in user.

Figure 10:
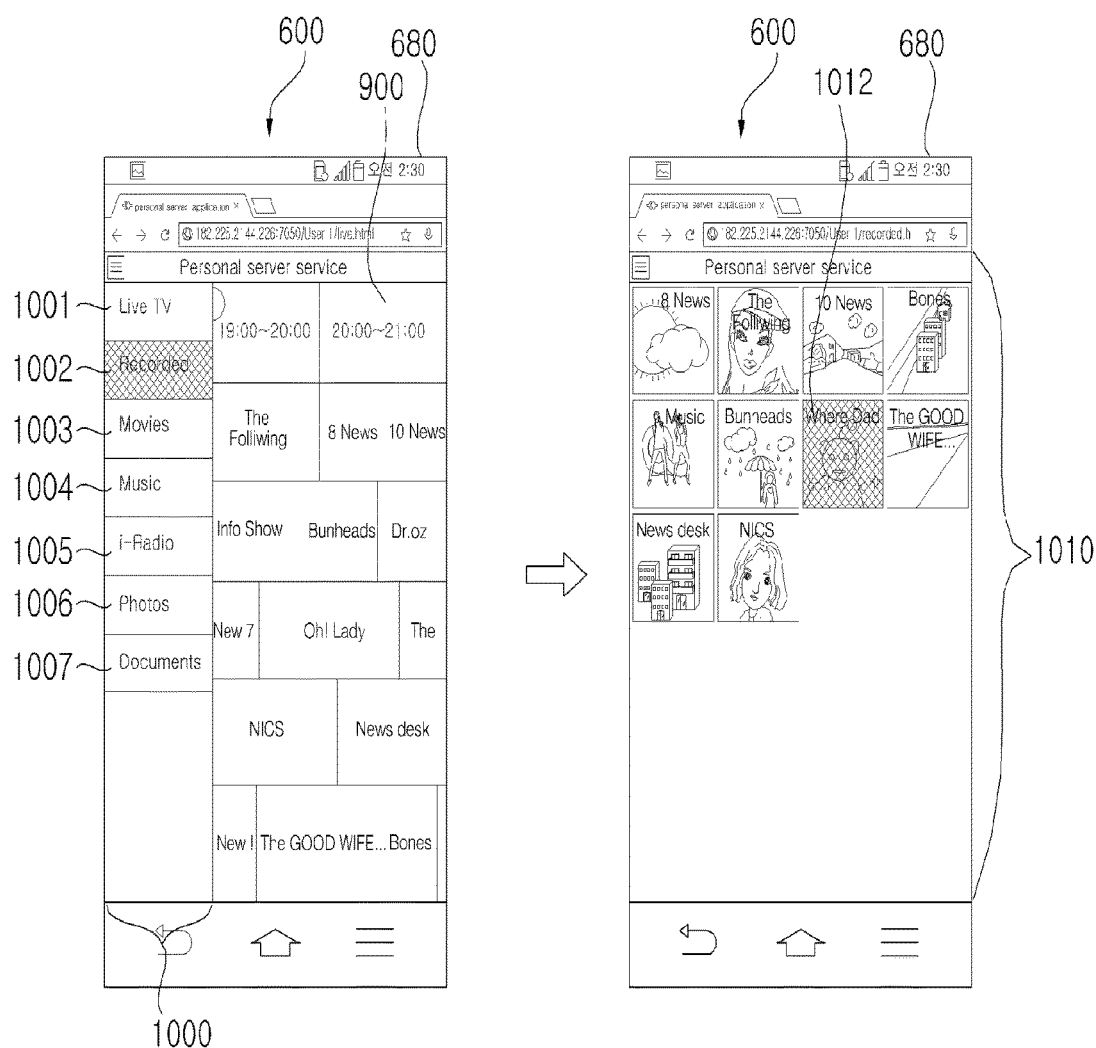

Meanwhile, the screens of connection to a personal server may be distinguished from each other by content items. FIG. 10 illustrates display of a menu 1000 including a live TV item 1001, a recommended item 1002, a movie item 1003, a music item 1004, a radio item 1005, a photo item 1006, and a document item 1007.

According to this method, the terminal 600 may acquire network information for connection to a personal server from the server 500, using a web browser, and may easily display the shared content list screen on the personal server based on the network information.

That is, as a separate application need not be installed and executed in the terminal 600, user convenience may be enhanced for the user of the terminal 600.

In addition, since it is possible to keep updating the private IP of the varying image providing apparatus 50, the terminal 600 may acquire information of the image providing apparatus 50, which is a personal server, by connecting to the server 500 without an additional procedure.

Figure 9A:
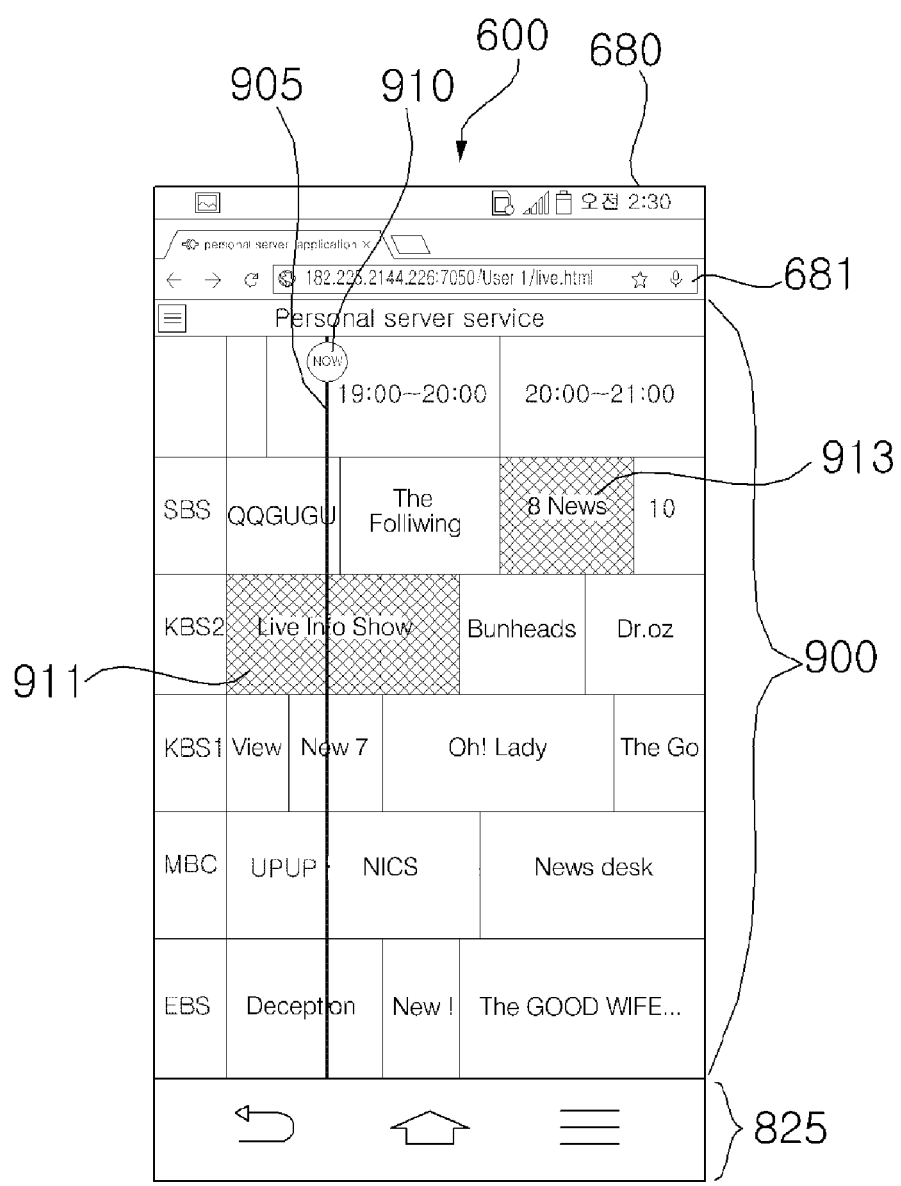

FIG. 9A illustrates displaying a broadcast information screen 900 on the display 680 in the terminal 600 connected to a personal server.

In particular, the broadcast information screen 900 of FIG. 9A may be a screen provided when the live TV item 1001 is selected from among various items in the menu 1000 of FIG. 10.

The broadcast information screen 900 may be a screen based on a broadcast information provided from a personal server, namely the image providing apparatus 50. That is, the broadcast information screen 900 may be provided based on the EPG information.

Broadcast information displayed on the terminal 600 may include information customized based on a TV channel available to the image providing apparatus 50. The broadcast information may provide information for the past one week before the current time or for one week after the current time. Using the broadcast information, the user may use functions such as real-time viewing, scheduled recording, scheduled viewing, recording, and the like.

In the figure, a bar 905 indicating the current time is exemplarily shown, and an indicator 910 indicating that a program is currently received from the image providing apparatus 50 and viewed is shown on the bar 9050.

In the figure, a first broadcast item 911 is highlighted among broadcast items positioned on the bar 905. Thereby, the user may intuitively recognize a currently received broadcast item.

When the user selects the first broadcast item 911, a detailed broadcast information screen 920 for the corresponding broadcasting may be displayed. The broadcast information screen 900 may be overlaid with the detailed broadcast information screen 920.

Meanwhile, to display the broadcast information screen as shown in FIG. 9A, the image providing apparatus 50 may operate as follows.

The first circuit board 100 may make a request for TV information registration and a connectable certification key to an external SDP server 9 not shown). In addition, the broadcast information collector 274 in the second circuit board 200 may request channel information and certification key information which are set in the first circuit board 100. The broadcast information collector 274 may make a request for broadcast information (EPG information) to the external SDP server 9 not shown) based on the acquire channel information.

After storing the received broadcast information in the second storage unit 240, the broadcast information collector 274 may provide a broadcast information service to the terminal 600 through the external device interface unit 230.

Figure 9B:
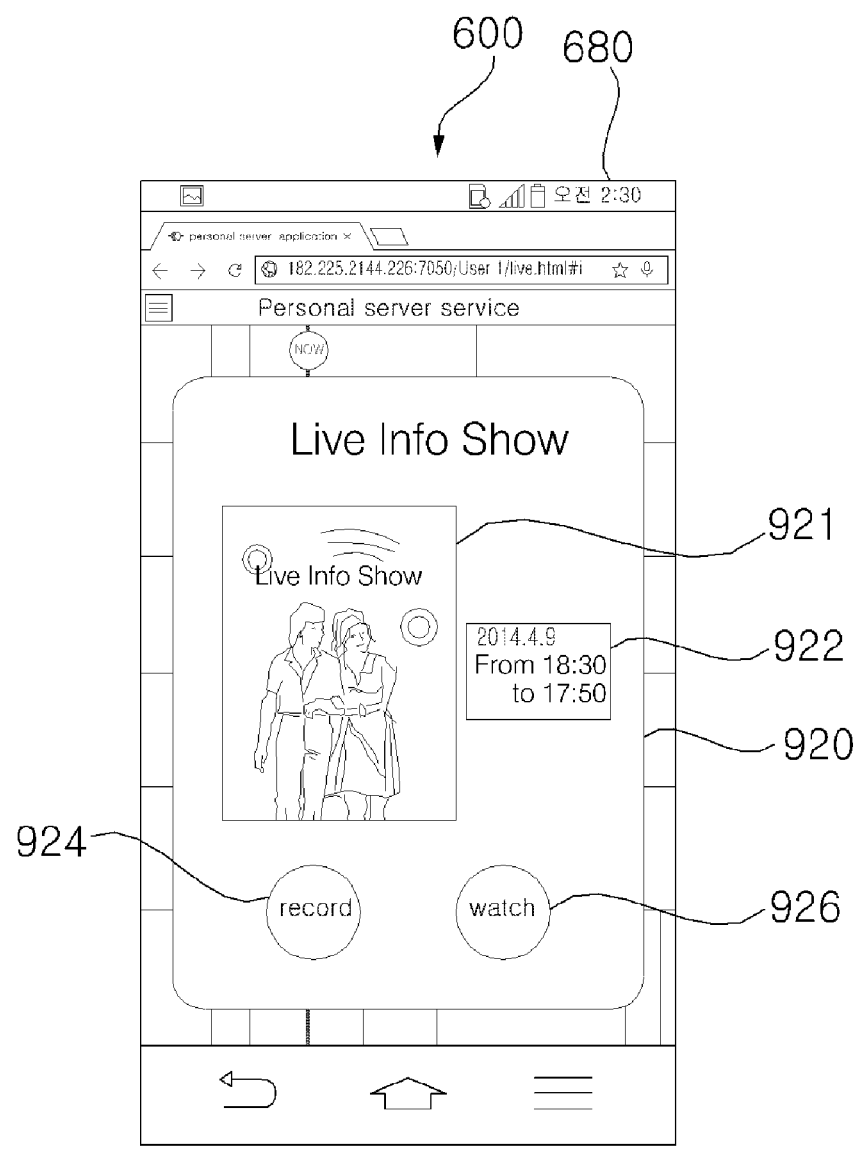

FIG. 9B illustrates a case where the detailed broadcast information screen 920 includes a broadcast-related thumbnail image 921, a broadcast time information 922, a Record item 924, and a Watch item 926.

Figure 9C:
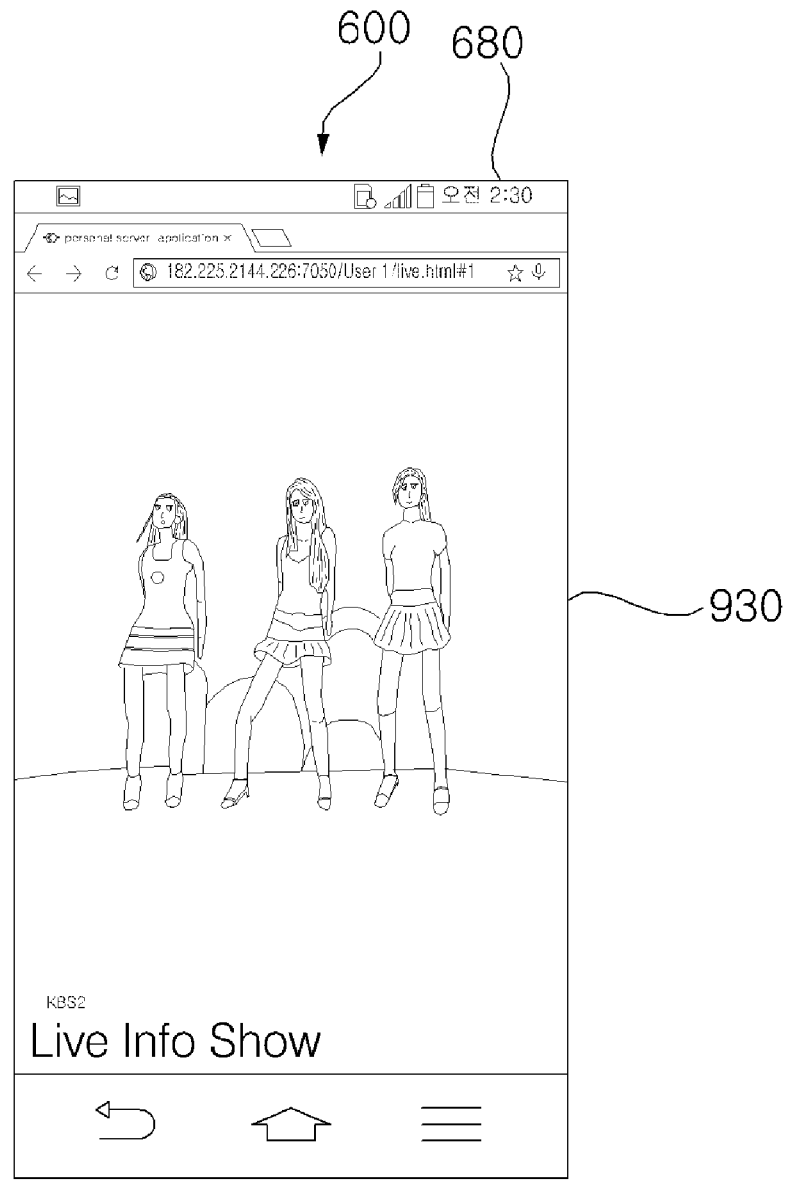

When the Watch item 926 is selected, a broadcast image 930 for the corresponding broadcast may be played and displayed on the display 680, as shown in FIG. 9C.

To this end, the terminal 600 may make a request to the personal server, namely the image providing apparatus 50 for reception, play and transmission of a stream of the corresponding broadcast image, and the image providing apparatus 50 may transmit a played a broadcast stream to the terminal 600. Thereby, the user may easily view a live broadcast image through the terminal 600.

In FIG. 9B, if the user selects a first broadcast item 911, a broadcast image 930 for the corresponding broadcast program may be played and displayed on the display 680 without separate display of detailed broadcast information as shown in FIG. 9C, since the program is currently broadcast.

If a second broadcast item 913 is selected in FIG. 9B, a detailed broadcast information screen 940 for the corresponding broadcast program may be displayed. In this case, the broadcast information screen 900 may be overlaid with the detailed broadcast information screen 940.

Figure 9D:
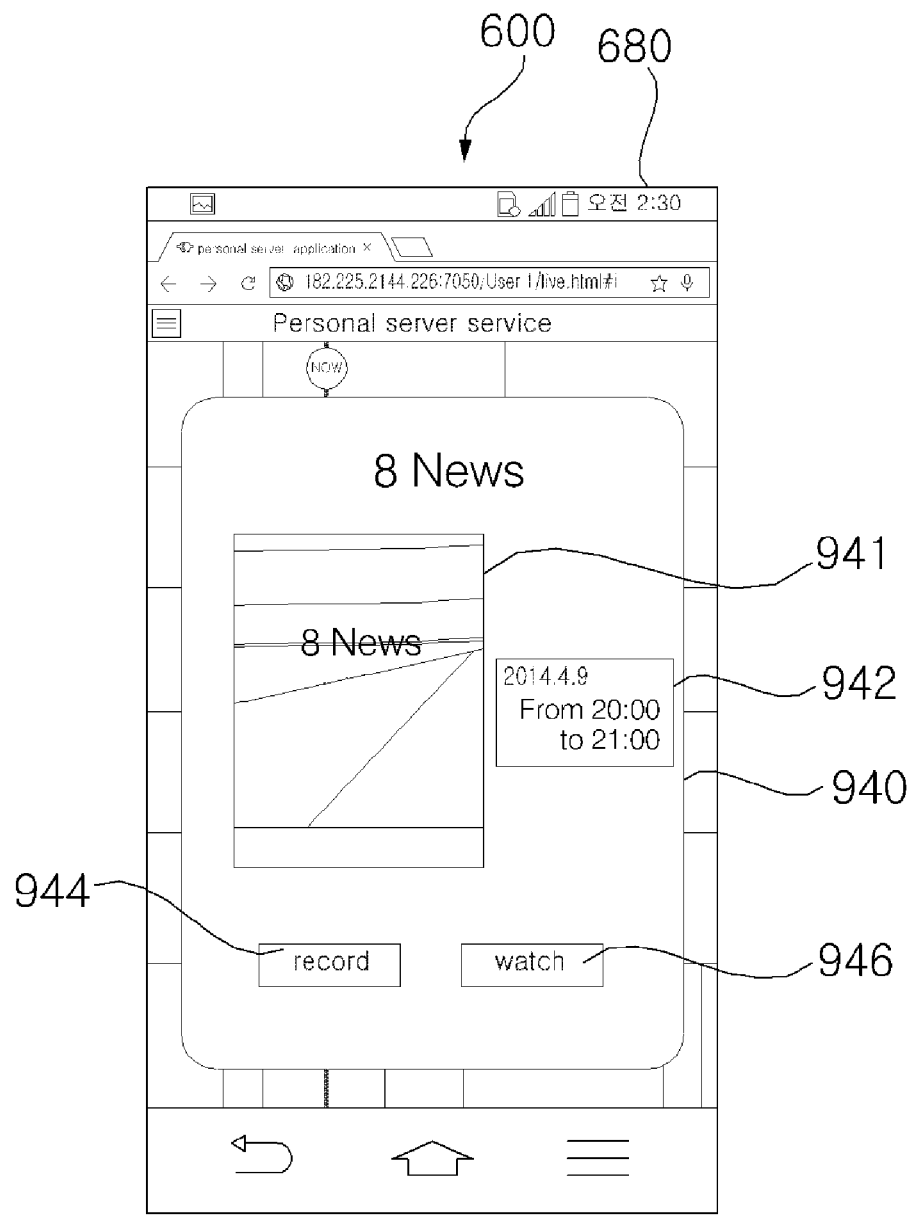

FIG. 9D illustrates a case where the detailed broadcast information screen 940 contains a broadcast program-related thumbnail image 941, broadcasting time information 942, a Record item 944, and a Watch item 946. Herein, the Watch item 946 may be deactivated or refer to scheduled watching.

When the Record item 944 is selected, setting scheduled recording may be performed. Thereby, the terminal 600 may make a request to the personal server, namely the image providing apparatus 50 for scheduled recording of the corresponding broadcast program and the personal server, namely, the image providing apparatus 50 may perform scheduled recording according to the request for scheduled recording.

In FIG. 9B, if the user selects the second broadcast item 913 which is not being broadcast is selected, setting of scheduled recording may be performed without display of separate detailed broadcast information.

FIG. 10 illustrates a case where the menu 1000 is activated, and the broadcast information screen 900 is overlaid with the menu 1000.

In the figure, a recommended item 1002 is selected from among the live TV item 1001, the recommended item 1002, the movie item 1003, the music item 1004, the radio item 1005, the photo item 1006, and the document item 1007 in the menu 100.

Thereby, the terminal 600 makes a request for a recommended content list to the personal server, namely the image providing apparatus 50, and the personal server, namely the image providing apparatus 50 transmits the recommended content list to the terminal 600.

In the figure, a recommended content screen 1010 corresponding to the received recommended content list is displayed on the display 680 of the terminal 600.

If a predetermined item 1012 is selected in the recommended content screen 1010, a corresponding content is played and displayed.

To this end, the terminal 600 may make a request to the personal server, namely the image providing apparatus 50 for reception, play, and transmission of the stream of the corresponding content image, and the image providing apparatus 50 may transmit a played content stream to the terminal 600. Thereby, the user may easily view the content image through the terminal 600.

The respective screens displayed on the terminal 600 in in FIGS. 8A to 10 are implemented and displayed on a web browser.

FIGS. 11 to 18 illustrate various examples of signal processing in an image providing apparatus.

Figure 11:
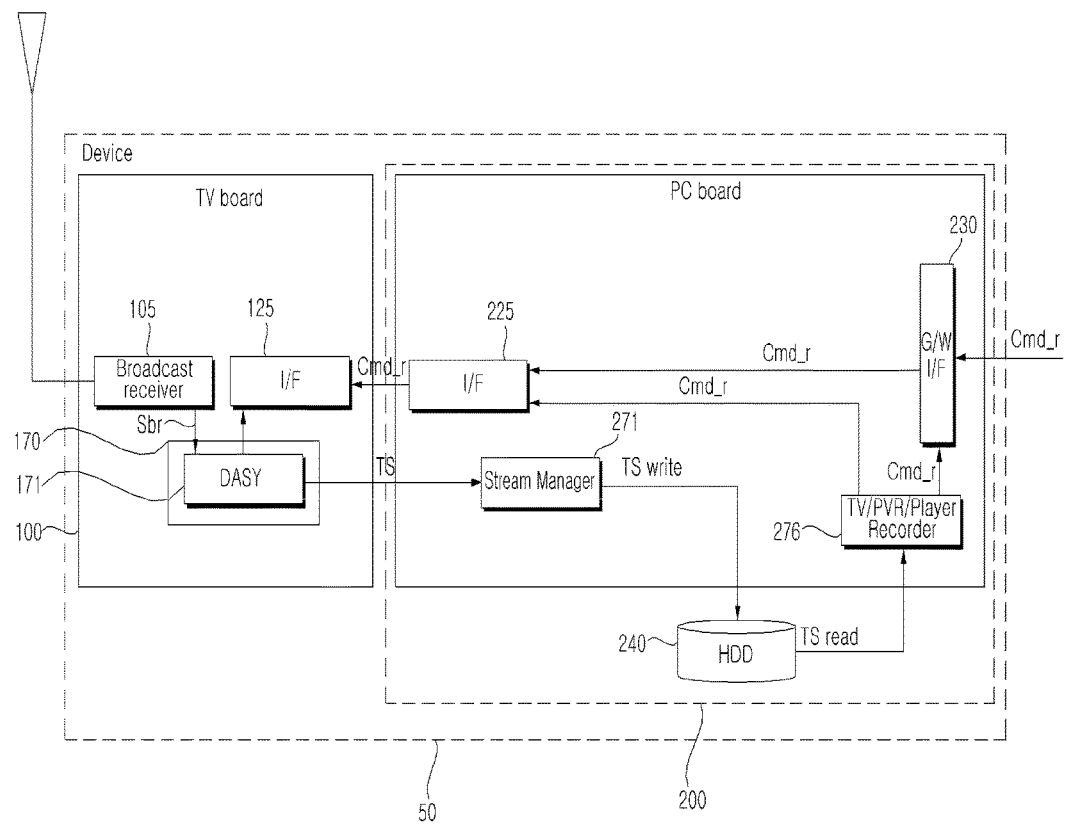

FIG. 11 illustrates signal processing in the image providing apparatus 50 performed when a recording request is made by the terminal 600.

When a Record broadcast command Cmd_r is received from the terminal 600, the second external device interface unit 230 delivers the Record broadcast command Cmd_r to the second interface unit 225. The Record broadcast command Cmd_r is delivered to the first processor 170 via the first interface unit 125. Thereby, the broadcast receiver 105 receives a broadcast signal Sbr of a channel corresponding to the Record broadcast command Cmd_r, and the received broadcast signal Sbr is delivered to the first processor 170.

The DSWY 171 in the first processor 170 converts the broadcast signal Sbr into a stream Ts, and delivers the stream Ts to the stream manager 271 in the second processor 270. The stream manager 271 reconfigures the stream Ts, and performs a control operation to store the reconfigured stream Ts in the second storage unit 240.

Meanwhile, if a Play Recorded Broadcasting command is received, the player 276 reads the stream Ts from the storage unit 240 and plays the same.

When a Record broadcast command Cmd_r is received from the terminal 600, the player 276 may transmit a command cmd for causing the Record broadcast command Cmd_r to be delivered to the second interface unit 225.

Figure 12:
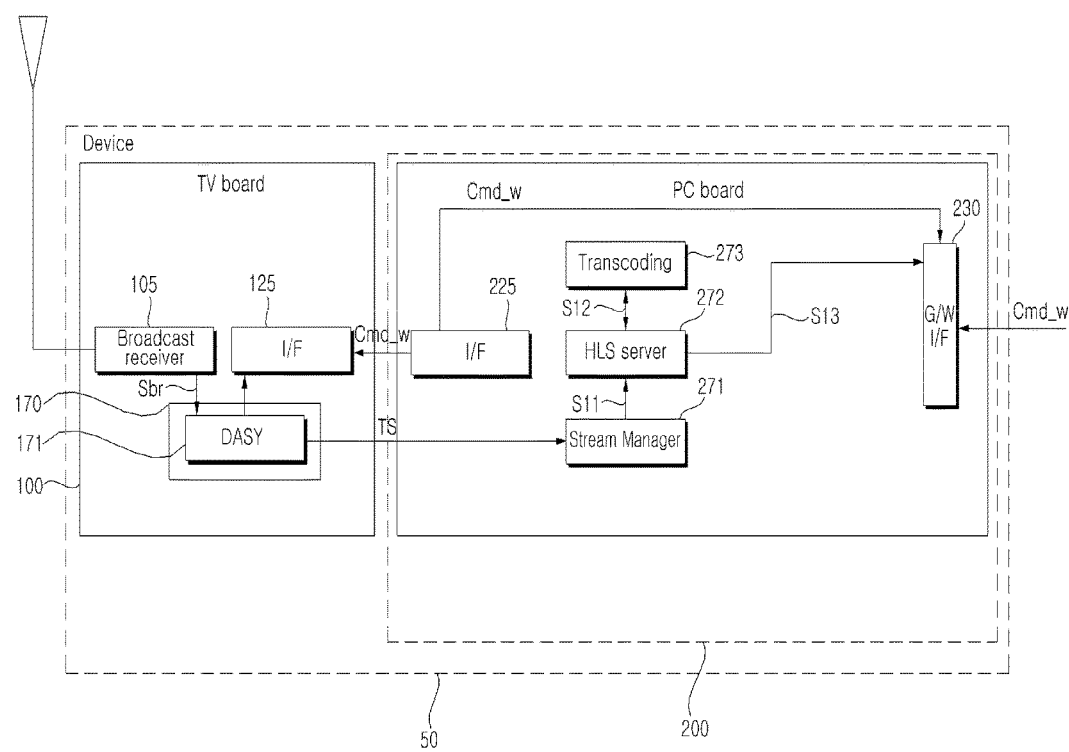

FIG. 12 illustrates signal processing in the image providing apparatus 50 performed when a request for watching live broadcast is received from the terminal 600.

When a Watch Broadcast command Cmd_w is received from the terminal 600, the second external device interface unit 230 delivers the Watch Broadcast command Cmd_w to the second interface unit 225, and the Watch Broadcast command Cmd_w is delivered to the first processor 170 via the first interface unit 125. Thereby, the broadcast receiver 105 receives a broadcast signal Sbr of a channel corresponding to Watch Broadcast command Cmd_w, and delivers the received broadcast signal Sbr to the first processor 170.

The DSWY 171 in the first processor 170 converts the broadcast signal Sbr into a stream Ts, and delivers the stream Ts to the stream manager 271 in the second processor 270. The stream manager 271 reconfigures the stream Ts, and delivers the reconfigured stream S11 to the streaming server 272. The streaming server 272 transmits the stream S12 to the transcoder 273, and transcoder 273 performs transcoding of the stream into a file format appropriate for the terminal 600. The streaming server 272 transmits the transcoded stream S13 to the second external device interface unit 230, and the second external device interface unit 230 transmits the transcoded stream S13 to the terminal 600.

Figure 13:
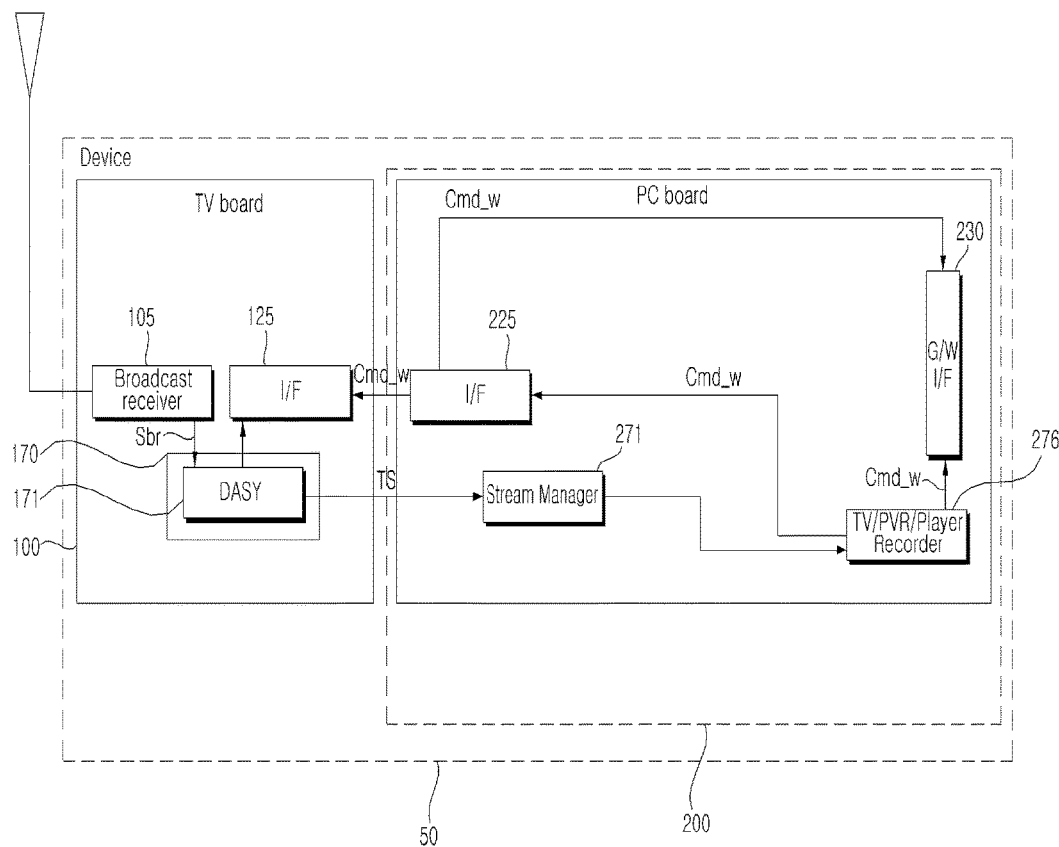

FIG. 13 illustrates signal processing in the image providing apparatus 50 performed when a live broadcast watch request is made in the image providing apparatus 50.

FIG. 13 illustrates a case where a live broadcast watch request is made in the image providing apparatus 50, and a time shift function is turned off for the played broadcast image.

When a live broadcast watch request is made in the image providing apparatus 50, the player 276 may transmit a Watch Broadcast command Cmd_w to the second interface unit 225.

The second external device interface unit 230 delivers the Watch Broadcast command Cmd_w to the second interface unit 225. The Watch Broadcast command Cmd_w is then delivered to the first processor 170 via the first interface unit 125. Thereby, the broadcast receiver 105 receives a broadcast signal Sbr of a channel corresponding to the Watch Broadcast command Cmd_w, and the received broadcast signal Sbr is delivered to the first processor 170.

The DSWY 171 in the first processor 170 converts the broadcast signal Sbr into a stream Ts, and delivers the stream Ts to the stream manager 271 in the second processor 270. The stream manager 271 may deliver the stream Ts to the player 276, and the player 276 may play the stream Ts such that the stream Ts is displayed on the display 180.

Figure 14:
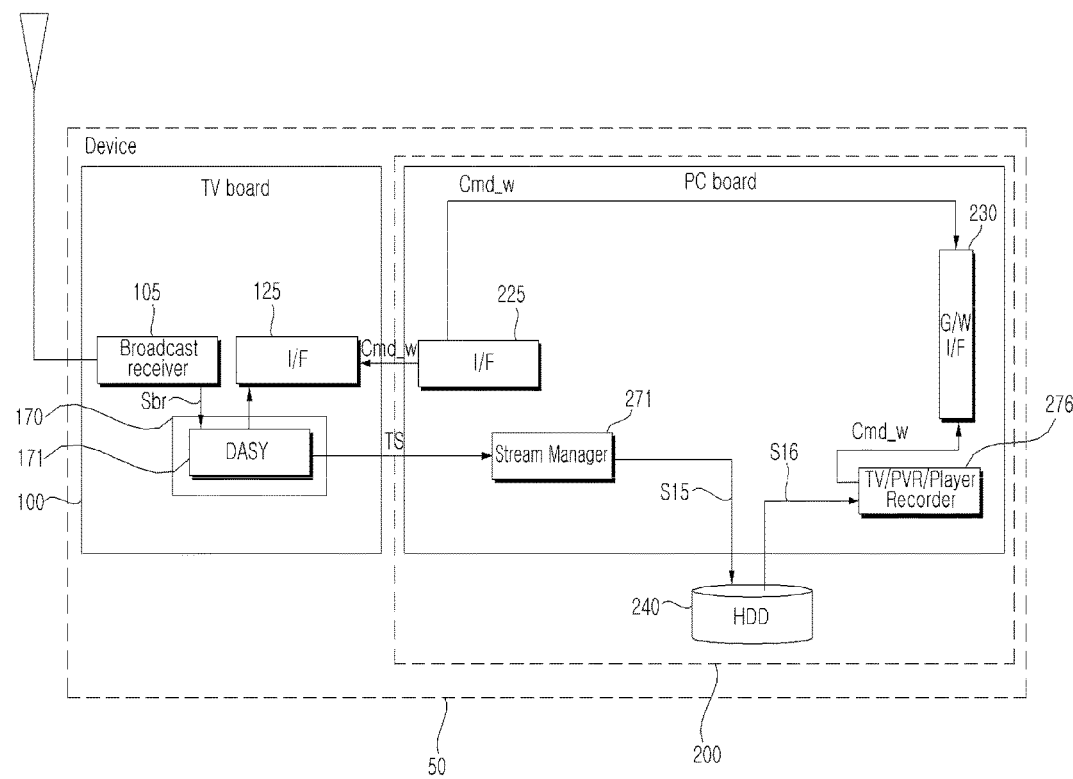

FIG. 14 illustrates another example of signal processing in the image providing apparatus 50 performed when a live broadcast watch request is made in the image providing apparatus 50.

FIG. 14 illustrates a case where a live broadcast watch request is made in the image providing apparatus 50, and a time shift function is turned on for the played broadcast image.

The signal processing technique of FIG. 14 is similar to that of FIG. 13, but is different from the example of FIG. 13 in that the time shift function is turned on, and a stream is played after being stored in the second storage unit 240.

When a live broadcast watch request is made in the image providing apparatus 50, the player 276 may transmit a Watch Broadcast command Cmd_w to the second interface unit 225.

The second external device interface unit 230 delivers the Watch Broadcast command Cmd_w to the second interface unit 225. The Watch Broadcast command Cmd_w is delivered to the first processor 170 via the first interface unit 125. Thereby, the broadcast receiver 105 receives a broadcast signal Sbr of a channel corresponding to the Watch Broadcast command Cmd_w, and the received broadcast signal Sbr is delivered to the first processor 170.

DSWY 171 in the first processor 170 converts the broadcast signal Sbr into a stream Ts, and delivers the stream Ts to the stream manager 271 in the second processor 270.

The stream manager 271 reconfigures the stream Ts, and performs a control operation to store the reconfigured stream Ts in the second storage unit 240.

The player 276 reads the stream Ts from the second storage unit 240 and plays the same. The player 276 may play the stream such that the stream is displayed on the display 180.

Figure 15:
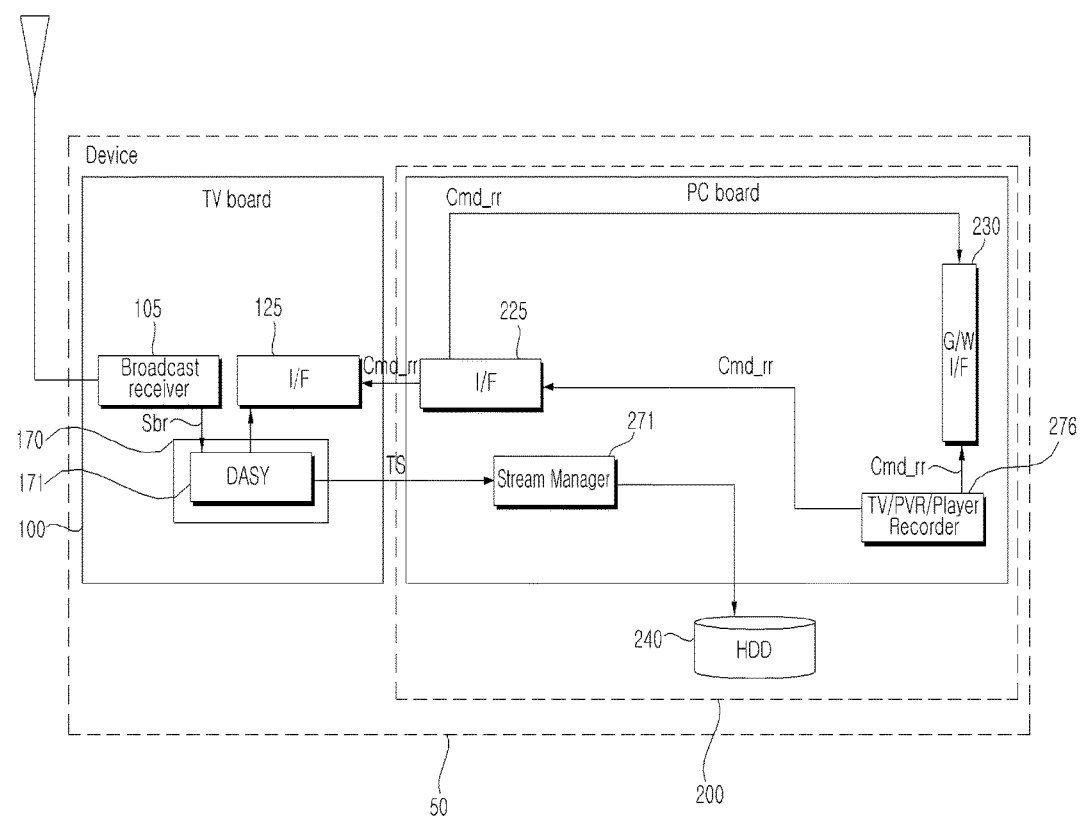

FIG. 15 illustrates signal processing performed when a scheduled recording function is performed in the image providing apparatus 50.

When a scheduled broadcast recording command Cmd_rr is received from the terminal 600 inside or outside the image providing apparatus 50, the player 276 may deliver the scheduled broadcast recording command Cmd_rr to the second external device interface unit 230.

The second external device interface unit 230 delivers the scheduled broadcast recording command Cmd_rr to the second interface unit 225, and the scheduled broadcast recording command Cmd_rr is delivered to the first processor 170 via the first interface unit 125.

The first processor 170 stores the scheduled broadcast recording command Cmd_rr in a scheduled recording list and controls the broadcast receiver 105 to receive a broadcast signal of the corresponding channel when it is the scheduled recording time.

Thereby, the broadcast receiver 105 receives a broadcast signal Sbr of a channel corresponding to the scheduled broadcast recording command Cmd_rr, and delivers the received broadcast signal Sbr to the first processor 170.

The DSWY 171 in the first processor 170 converts the broadcast signal Sbr into a stream Ts, and delivers the stream Ts to the stream manager 271 in the second processor 270. The stream manager 271 reconfigures the stream Ts, and performs a control operation to store the reconfigured stream Ts in the second storage unit 240.

Figure 16:
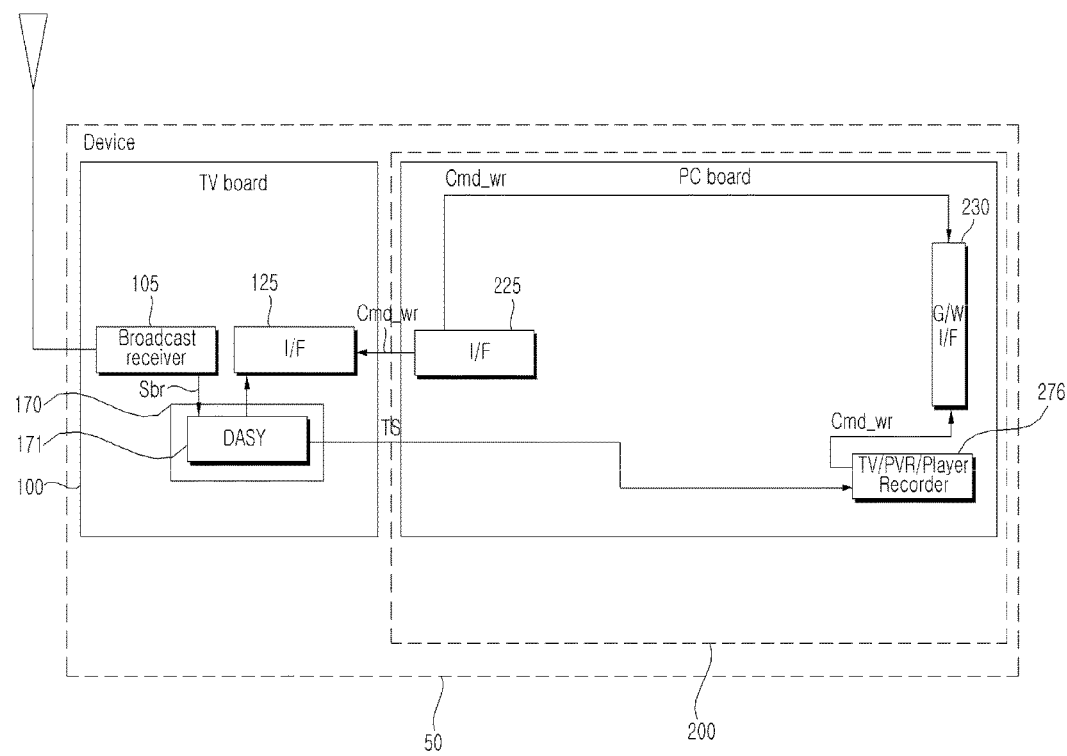

FIG. 16 illustrates signal processing performed when a scheduled watch function is performed in the image providing apparatus 50.

When a Watch Scheduled Broadcast command Cmd_wr is received from the terminal 600 inside or outside the image providing apparatus 50, the player 276 may deliver the Watch Scheduled Broadcast command Cmd_wr to the second external device interface unit 230.

The second external device interface unit 230 delivers the Watch Scheduled Broadcast command Cmd_wr to the second interface unit 225, and the Watch Scheduled Broadcast command Cmd_wr is delivered to the first processor 170 via the first interface unit 125.

The first processor 170 stores the Watch Scheduled Broadcast command Cmd_wr in a scheduled recording list and controls the broadcast receiver 105 to receive a broadcast signal of the corresponding channel when it is the scheduled watch time.

Thereby, the broadcast receiver 105 receives a broadcast signal Sbr of a channel corresponding to the Watch Scheduled Broadcast command Cmd_wr, and delivers the received broadcast signal Sbr to the first processor 170.

The DSWY 171 in the first processor 170 converts the broadcast signal Sbr into a stream Ts, and delivers the stream Ts to the player 276 in the second processor 270. The player 276 may play the stream Ts such that the stream Ts is displayed on the display 180.

Figure 17:
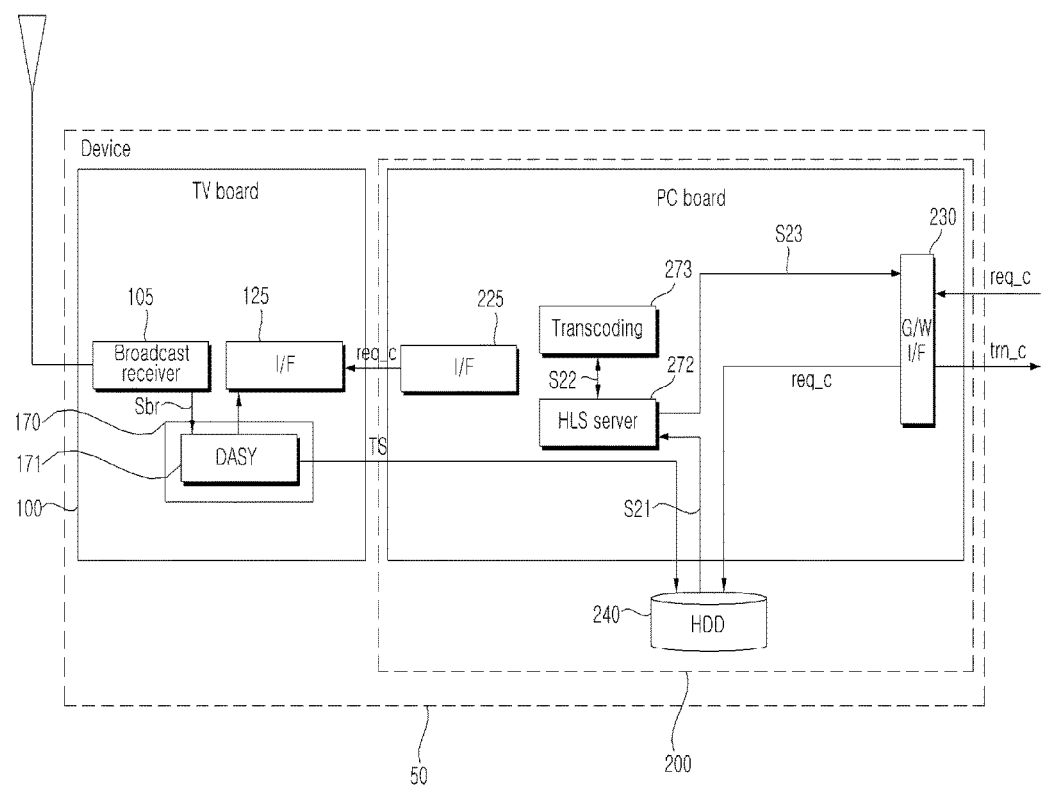
Figure 18:
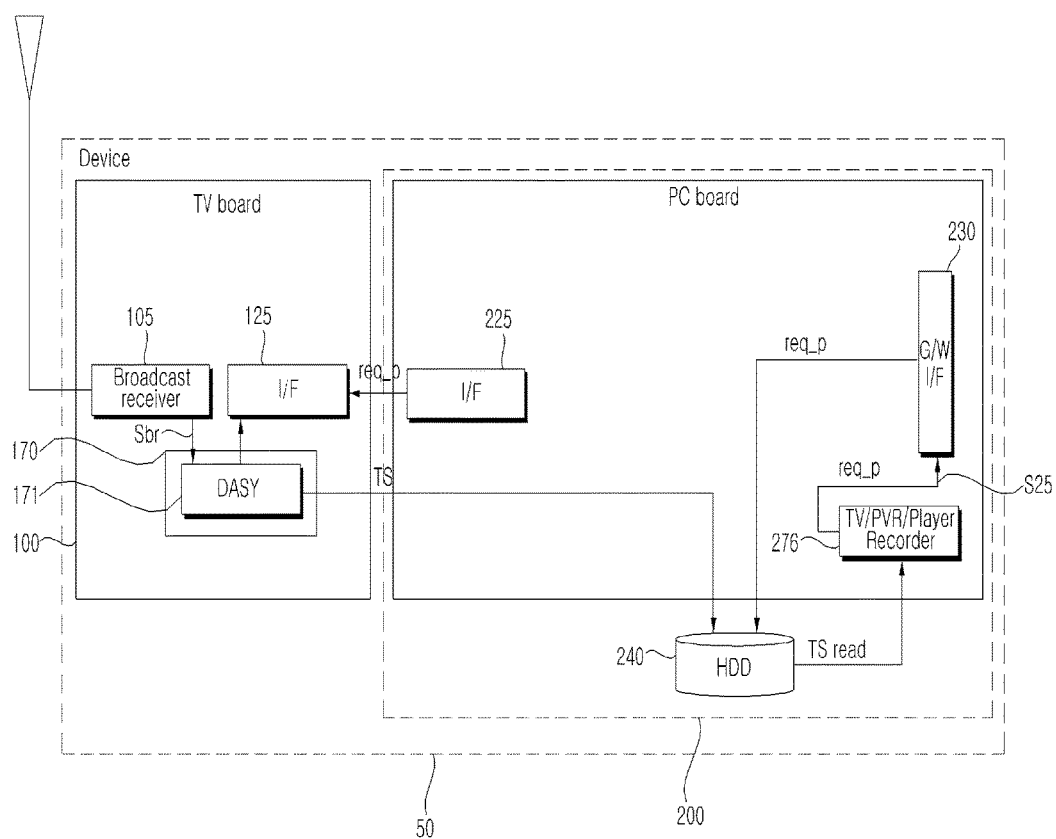

FIG. 17 illustrates signal processing performed when a content transmission request is made in the terminal 600.

When a content transmission request req_c is received from the terminal 600, the second external device interface unit 230 transmits the content transmission request req_c to the second storage unit 240.

Then, the second storage unit 240 transmits a stored content S21 to the streaming server 272. The streaming server 272 transmits a stream S22 to the transcoder 273, and the transcoder 273 performs transcoding of the stream into a file format appropriate for the terminal 600. The streaming server 272 transmits the transcoded stream S23 to the second external device interface unit 230, and second external device interface unit 230 transmits the transcoded stream trn_c to the terminal 600.

If a content transmission request is made, and the corresponding content is a live broadcast image, the content transmission request req_c may correspond to the Watch Broadcast command Cmd_w of FIG. 12.

Thereby, the content transmission request req_c may be delivered from the second interface unit 225 to the first processor 170 via the first interface unit 125. Then, the broadcast receiver 105 receives a broadcast signal Sbr of a channel corresponding to the content transmission request req_c, and the received broadcast signal Sbr is delivered to the first processor 170.

The DSWY 171 in the first processor 170 may convert the broadcast signal Sbr into a stream Ts such that the stream is stored in the second storage unit 240. As described above, the broadcast content stored in the second storage unit 240 may be transmitted to the terminal 600 via the second external device interface unit 230.

FIG. 17 illustrates signal processing performed when a content transmission request is made in the image providing apparatus 50.

When a content request req_p is received in the image providing apparatus 50, the player 276 may deliver the content request req_p to the second external device interface unit 230.

The second external device interface unit 230 transmits the received content request req_p to the second storage unit 240.

Then, the second storage unit 240 transmits a stored content Ts read to the player 276.

If there is a content request req_p, and the corresponding content is a live broadcast image, the content request req_p may correspond to the Watch Broadcast command Cmd_w of FIG. 14.

Thereby, the content transmission request req_c may be delivered from the second interface unit 225 to the first processor 170 via the first interface unit 125. Thereby, the broadcast receiver 105 receives a broadcast signal Sbr of a channel corresponding to the content request req_p, and the received broadcast signal Sbr is delivered to the first processor 170.

The DSWY 171 in the first processor 170 may convert the broadcast signal Sbr into a stream Ts such that the stream is stored in the second storage unit 240. As described above, the broadcast content stored in the second storage unit 240 may be transmitted to the player 276.

An operation method for the image providing apparatus according to the present invention is implementable by code which can be read by the processor on a recording medium which can be read by a processor provided to autonomous driving apparatus or vehicle. The recording medium readable by the processor includes all kinds of recording devices for storing data which can be read by the processor. Examples of the recording medium readable by the processor include ROM, RAM, CD-ROM, magnetic tape, floppy disk, and optical data storage. The method is also implementable in the form of a carrier wave such as transmission over the Internet. In addition, the recording medium readable by the processor may be distributed to computer systems connected over a network, and code which can be read by the processor in a distributed manner may be stored in the recording medium and executed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. The variant embodiments should not be individually understood from the spirit or prospect of the present invention.

The invention claimed is:

1. A server comprising: a memory to store a personal server list and network information of an image providing apparatus corresponding to the personal server list;
   an interface to receive a connection request from a terminal in response to a Web address input to the terminal;
   a processor electrically coupled to the memory and the interface, and configured to: perform a control operation to transmit information for connection to a personal server to the terminal according to a connection request;
   perform a control operation, when login information is received from the terminal, to transmit personal server list information corresponding to the login information to the terminal;
   perform a control operation, when the terminal makes a request for information corresponding to a specific personal server list of the personal server list, to transmit, to the terminal, network information of an image providing apparatus corresponding to a corresponding personal server,
   wherein a corresponding personal server stores thumbnails for a shared content list and a recommended content list, wherein the network information comprises public IP information and private IP information of the image providing apparatus, wherein the private IP information changes whenever the image providing apparatus is turned on, and wherein the interface connects to the image providing apparatus to receive new network information of the image providing apparatus whenever the image providing apparatus is turned on; and perform a control operation to update the memory with the new network information.

2. The server according to claim 1, wherein, when the login information is received from the terminal, the processor performs a control operation to transmit advertisement information in addition to the personal server list information to the terminal.

3. The server according to claim 1, wherein the processor provides first advertisement information to the terminal before receiving the login information from the terminal, and provides second advertisement information to the terminal after receiving the login information, the second advertisement information being different from the first advertisement information.

4. The server according to claim 1, wherein the processor performs a control operation to further transmit device information and account information of the image providing apparatus in transmitting the network information.

5. The server according to claim 3, wherein the second advertisement information comprises advertisement information based on the login information.

6. An image providing apparatus comprising:
a broadcast receiver to receive a broadcast signal;
an interface to exchange data with a server or a terminal;
a memory to store a content containing a broadcast image;
a processor electrically coupled to the broadcast receiver, the memory, and the interface, and configured to:
perform a control operation to transmit network information and device information to perform product registration in the server, the network information comprising public IP information and private IP information;
perform a control operation to transmit shared content list, recommended content list, and thumbnails associated with each list stored in the memory according to a request from the terminal when a Web address for the server is input to the terminal and when the terminal remotely connects to the image providing apparatus;
perform a control operation, when a predetermined broadcast content is selected from a thumbnail for the shared content list or recommended content list, to transmit the selected broadcast content to the terminal, wherein the private IP information changes whenever the image providing apparatus is turned on; and transmit new network information of the image providing apparatus to the server whenever the image providing apparatus is turned on.

7. The image providing apparatus according to claim 6, wherein, when a Record broadcast command is received from the terminal, the processor controls the broadcast receiver to receive a broadcast signal of a corresponding channel in response to the Record broadcast command and performs a control operation to store a stream corresponding to the broadcast signal in the memory.

8. The image providing apparatus according to claim 6, wherein, when a Watch Broadcast command is received from the terminal, the processor controls the broadcast receiver to receive a broadcast signal of a corresponding channel in response to the Watch Broadcast command, and performs a control operation to transcode a stream corresponding to the broadcast signal and to transmit the transcoded stream to the terminal via the interface.

9. The image providing apparatus according to claim 6, wherein, when a time shift function is turned off with a live broadcast watch request in the image providing apparatus, the processor controls the broadcast receiver to receive a broadcast signal of a corresponding channel in response to the Watch Broadcast command, and performs a control operation to play a stream corresponding to the broadcast signal and display the same on a display.

10. The image providing apparatus according to claim 6, wherein, when a time shift function is turned on with a live broadcast watch request in the image providing apparatus, the processor controls the broadcast receiver to receive a broadcast signal of a corresponding channel in response to the Watch Broadcast command, and performs a control operation to store a stream corresponding to the broadcast signal in the memory and to reproduce the stream stored in the memory and display the stream being reproduced on a display.

11. The image providing apparatus according to claim 6, wherein, when a scheduled recording command is received from the image providing apparatus or the terminal, the processor controls the broadcast receiver to receive a broadcast signal of a corresponding channel in response to the scheduled recording command, and performs a control operation to store a stream corresponding to the broadcast signal in the memory.

12. The image providing apparatus according to claim 6, wherein, when a scheduled watch command is received from the image providing apparatus or the terminal, the processor controls the broadcast receiver to receive a broadcast signal of a corresponding channel in response to the scheduled watch command, and performs a control operation to reproduce a stream corresponding to the broadcast signal and display the stream being reproduced on a display.

13. The image providing apparatus according to claim 6, wherein, when a content transmission request is received from the terminal, the processor performs a control operation to transmit a corresponding content to the terminal through the interface among contents stored in the memory.

14. The image providing apparatus according to claim 6, further comprising:
a second processor to control the broadcast receiver,
wherein the processor runs a second OS different from a first OS run by the second processor, and executes an application, the application being based on the second OS.

15. An image providing system comprising: a terminal;
a server comprising a memory to store a personal server list and network information of an image providing apparatus corresponding to the personal server list, and configured to;
transmit, when a Web address for the server is input to the terminal, information for connection to a personal server to the terminal according to a connection request from the terminal;
transmit, when login information is received from the terminal, personal server list information corresponding to the login information to the terminal; and transmit, when the terminal makes a request for information corresponding to a specific personal server list of the personal server list, network information of an image providing apparatus corresponding to a corresponding personal server;

and the image providing apparatus comprising a memory and configured to: transmit a shared content list, a recommended content list, and thumbnails associated with each list stored in the memory of the image providing apparatus according to a request from the terminal when the terminal remotely connects to the image providing apparatus;

transmit, when a predetermined broadcast content is selected from the shared content list, the selected broadcast content to the terminal, wherein the network information comprises public IP information and private IP information of the image providing apparatus, and the private IP information changes whenever the image providing apparatus is turned on; and transmit new network information of the image providing apparatus to the server whenever the image providing apparatus is turned on, wherein the server is further configured to: receive the new network information of the image providing apparatus whenever the image providing apparatus is turned on, and update the memory of the server with the new network information.

16. The image providing system according to claim 15, wherein the terminal comprises:

a display; and a controller operably coupled with the display and configured to:

perform a control operation to run a web browser;

perform a control operation, when a web address for the server is input in an input window, to display a screen for connection to the personal server based on the received information for connection to the personal server;

perform a control operation, when login information is input, to display the personal server list screen based on the received personal server list information and advertisement information received from the server; and perform a control operation, when a specific personal server is selected from the personal server list, to connect to an image providing apparatus corresponding to the selected specific personal server.

* * * * *